United States Patent
Sun et al.

(10) Patent No.: US 11,813,743 B2
(45) Date of Patent: Nov. 14, 2023

(54) SIX DEGREE-OF-FREEDOM AND THREE DEGREE-OF-FREEDOM ROBOTIC SYSTEMS FOR AUTOMATIC AND/OR COLLABORATIVE FASTENING OPERATIONS

(71) Applicant: GM GLOBAL TECHNOLOGY OPERATIONS LLC, Detroit, MI (US)

(72) Inventors: Qiao Sun, Shanghai (CN); Xianbao Chen, Shanghai (CN); Jing Sun, Shanghai (CN); Dalong Gao, Rochester, MI (US); Feng Gao, Shanghai (CN); Ningjian Huang, Bingham Farms, MI (US)

(73) Assignees: GM GLOBAL TECHNOLOGY OPERATIONS LLC, Detroit, MI (US); Shanghai JiaoTong University, Shanghai (CN)

( * ) Notice: Subject to any disclaimer, the term of this patent is extended or adjusted under 35 U.S.C. 154(b) by 0 days.

(21) Appl. No.: 17/554,549

(22) Filed: Dec. 17, 2021

(65) Prior Publication Data

US 2023/0150117 A1    May 18, 2023

(30) Foreign Application Priority Data

Nov. 17, 2021  (CN) .......................... 202111363486.1

(51) Int. Cl.
*B25J 9/00* (2006.01)
*B25J 9/10* (2006.01)
(Continued)

(52) U.S. Cl.
CPC ............. *B25J 9/0072* (2013.01); *B25J 9/106* (2013.01); *B25J 11/005* (2013.01); *B25J 13/085* (2013.01); *B25J 17/0216* (2013.01)

(58) Field of Classification Search
CPC ........ B25J 9/0072; B25J 9/106; B25J 11/005; B25J 13/085; B25J 17/0216; B25J 13/003;
(Continued)

(56) References Cited

U.S. PATENT DOCUMENTS 6,543,987 B2 *  4/2003  Ehrat .................... B25J 9/0051
                                                    414/735
D628,609 S     12/2010  Linn et al.
(Continued)

FOREIGN PATENT DOCUMENTS

EP      2301726 A1      3/2011
WO   WO-2014040937 A1   3/2014

OTHER PUBLICATIONS

Office Action dated Oct. 26, 2022 from German Patent Office for German Patent Application No. 102021133137.4; 4 pages.
U.S. Appl. No. 17/554,161, filed Dec. 17, 2021, Sun et al.

*Primary Examiner* — Zakaria Elahmadi

(57) ABSTRACT

A robotic system includes a support structure, a platform, a center serial chain, outer serial chains, motors, a sensor, and a control module. The center serial chain connects a center of the platform to the support structure and includes first joints connected to a linear sliding shaft. The outer serial chains are disposed radially outward of the center serial chain. Each of the outer serial chains includes second joints connecting a bar to the platform and the supporting structure. The motors are connected to the outer serial chains. The sensor is connected to the platform and detects at least one of force or torque applied by a human operator on the platform and generates a signal indicative thereof. The control module controls the motors based on the signal to assist the human operator in at least one of moving or rotating the platform.

20 Claims, 20 Drawing Sheets

(51) Int. Cl.
  *B25J 17/02*   (2006.01)
  *B25J 13/08*   (2006.01)
  *B25J 11/00*   (2006.01)

(58) Field of Classification Search
  CPC ........ B25J 13/081; B25J 13/082; B25J 13/02;
          B25J 9/0033; B25J 9/0036; B25J 9/0039;
                    G01L 5/16; G01L 5/22
  See application file for complete search history.

(56) References Cited

U.S. PATENT DOCUMENTS

| | | | |
|---|---|---|---|
| 7,992,733 B2 | 8/2011 | Laliberte et al. | |
| 8,181,799 B2 | 5/2012 | Laliberte et al. | |
| 8,424,941 B2 | 4/2013 | Ihrke et al. | |
| 8,498,741 B2 | 7/2013 | Ihrke et al. | |
| 8,511,964 B2 | 8/2013 | Linn et al. | |
| 8,562,049 B2 | 10/2013 | Ihrke et al. | |
| 8,601,897 B2 | 12/2013 | Lauzier et al. | |
| 8,849,453 B2 | 9/2014 | Bergelin et al. | |
| 9,085,308 B2 | 7/2015 | Laliberte et al. | |
| 9,266,440 B2 | 2/2016 | Gao et al. | |
| 9,359,176 B2 | 6/2016 | Gao et al. | |
| 9,770,993 B2 | 9/2017 | Zhao et al. | |
| 2001/0019692 A1* | 9/2001 | Ehrat ................... | B25J 17/0266 414/735 |
| 2003/0106230 A1* | 6/2003 | Hennessey ........... | H02N 2/0095 33/645 |
| 2004/0052628 A1* | 3/2004 | Thurneysen ......... | B23Q 1/4852 414/730 |
| 2005/0129495 A1* | 6/2005 | Brogardh ............... | B25J 9/0072 414/680 |
| 2010/0122602 A1* | 5/2010 | Marcroft .............. | B25J 17/0216 901/18 |
| 2011/0100145 A1* | 5/2011 | Feng ..................... | B25J 9/0051 74/490.01 |
| 2011/0113915 A1* | 5/2011 | Zhang .................. | B25J 17/0266 74/490.01 |
| 2011/0113918 A1* | 5/2011 | Zhao .................... | B25J 17/0266 74/490.05 |
| 2011/0120254 A1* | 5/2011 | Zhang .................. | B25J 17/0266 901/15 |
| 2011/0154936 A1* | 6/2011 | Zhao .................... | B25J 9/1065 74/490.04 |
| 2012/0266713 A1* | 10/2012 | Feng ..................... | B25J 9/0051 74/490.05 |
| 2012/0272773 A1* | 11/2012 | Monti .................. | B25J 17/0266 901/23 |
| 2013/0112641 A1 | 5/2013 | Laliberte et al. | |
| 2014/0257091 A1* | 9/2014 | Cutkosky ............... | A61B 34/70 74/490.01 |
| 2016/0039093 A1 | 2/2016 | Abdallah et al. | |
| 2017/0113356 A1* | 4/2017 | Huang ................. | B25J 17/0266 |
| 2018/0333842 A1* | 11/2018 | McEntee ............... | F16H 25/2204 |
| 2021/0046595 A1* | 2/2021 | Liu ........................ | B25J 9/0069 |

* cited by examiner

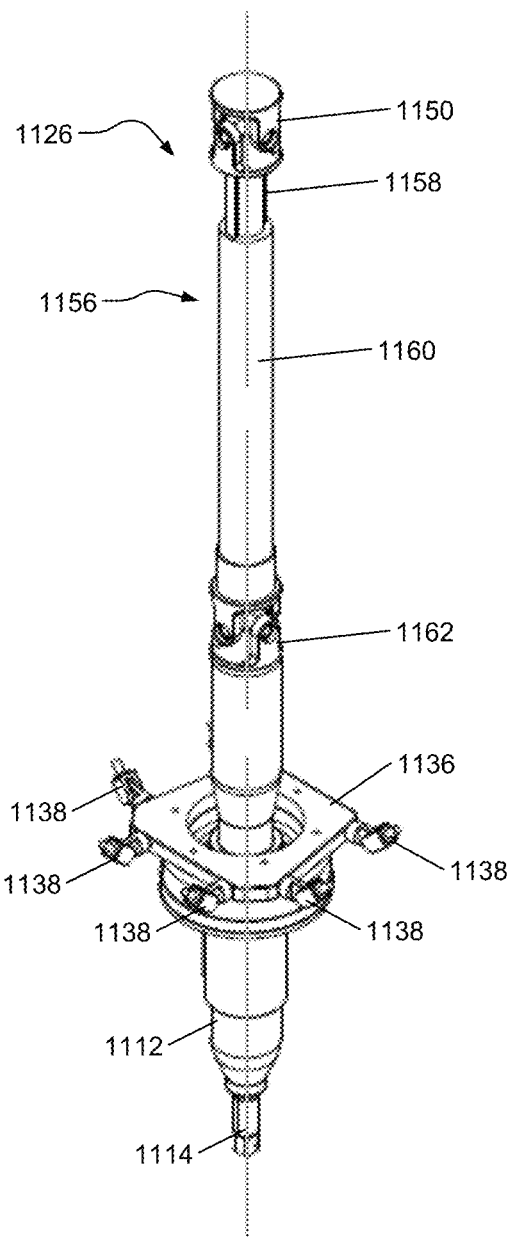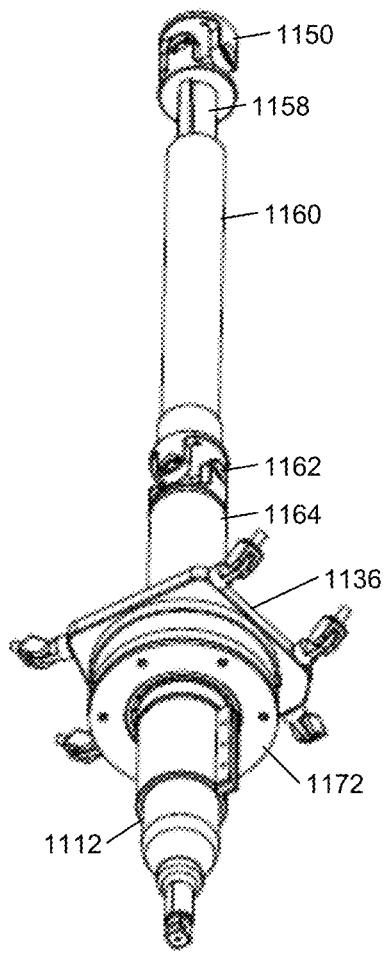
FIG. 14
FIG. 15

SIX DEGREE-OF-FREEDOM AND THREE DEGREE-OF-FREEDOM ROBOTIC SYSTEMS FOR AUTOMATIC AND/OR COLLABORATIVE FASTENING OPERATIONS

CROSS-REFERENCE TO RELATED APPLICATIONS

This application claims the benefit of Chinese Patent Application No. 202111363486.1, filed on Nov. 17, 2021. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to robotic systems used for fasteners during production.

During production of, for example, a vehicle, numerous fasteners (e.g., nuts, screws, bolts, etc.) are fastened to vehicle devices, assemblies, components, and structures. The fasteners may be fastened manually or using a fully automatic robotic system. When attached manually, a considerable amount of time is associated with setting, tightening (referred to herein as "running"), and properly torqueing down the fasteners. Cross-threading errors can occur when the fasteners are fastened manually, which slows production and increases costs due to the repair and/or replacement of the parts involved. At the same time, the operator needs to hold an electric tightening gun, which can take great strength to hold. If this process is repeated continuously, it can cause fatigue.

Although a fully automated robotic system can save time installing fasteners, the fully automated system is configured for a particular application and a particular device and/or component. For example, if nuts are being installed on an engine, the automated robotic system includes a one stop station that is configured for the particular engine and nuts involved. The nuts are typically the same size. The automated robotic system is not applicable to other devices and/or components. In addition, the fully automated system may include multiple fastening tools (e.g., nut runners) for fastening the nuts. A fully automated robotic system is bulky, complex and expensive.

SUMMARY

A robotic system is provided and includes a support structure, a movable platform, a center serial chain, outer serial chains, motors, a sensor, and a control module. The center serial chain connects directly or indirectly a center of the movable platform to the support structure and includes first joints connected directly or indirectly to a linear sliding shaft. The outer serial chains are disposed radially outward of the center serial chain. Each of the outer serial chains includes second joints connecting a bar directly or indirectly to the moveable platform and the supporting structure. The motors are connected to the outer serial chains. The sensor is connected to the movable platform and configured to detect at least one of force or torque applied by a human operator on the movable platform and generate a signal indicative of the at least one of force or torque applied. The control module is configured to control the motors based on the signal to assist the human operator in at least one of moving or rotating the movable platform.

In other features, the outer serial chains include at least three outer serial chains.

In other features, the outer serial chains include three pairs of outer serial chains. Each pair of outer serial chains includes two outer serial chains.

In other features, the outer serial chains includes six outer serial chains.

In other features, the second joints of each of the outer serial chains includes a first joint and a second joint. The first joint of each of the outer serial chains is a universal joint. The second joint of each of the outer serial chains is a spherical joint.

In other features, the outer serial chains include three pairs of chains. The control module is configured to independently actuate each of the outer serial chains.

In other features, the robotic system further includes linear sliders. The outer serial chains include three pairs of chains. Each of the three pairs of chains is connected to a respective one of the linear sliders.

In other features, the first joints of the center serial chain include a first joint and a second joint. The first joint and the second joint are universal joints.

In other features, a drive fork of the first joint is in alignment with a drive fork of the second joint. A driven fork of the first joint is in alignment with a driven fork of the second joint.

In other features, the outer serial chains and the center serial chain provide three degrees-of-freedom motion for the movable platform or six degrees-of-freedom motion for the movable platform.

In other features, the outer serial chains include: a first outer serial chain, a second outer serial chain, and a third outer serial chain. The second outer serial chain is disposed 120° of separation azimuthally from the first outer serial chain relative to a center line extending through the center serial chain. The third outer serial chain is disposed 120° of separation azimuthally from the first outer serial chain and the second outer serial chain relative to the center line extending through the center serial chain.

In other features, the outer serial chains include: a first outer serial chain; a second outer serial chain and a third outer serial chain. The second outer serial chain is disposed 90° of separation azimuthally from the first outer serial chain relative to a center line extending through the center serial chain. The third outer serial chain is disposed 180° of separation azimuthally from the first outer serial chain and the second outer serial chain relative to the center line extending through the center serial chain.

In other features, the robotic system further includes: a fastening tool; and a bearing disposed between the movable platform and the fastening tool.

In other features, the robotic system further includes a fastening tool attached to the center serial chain and rotating at least a portion of the center serial chain.

In other features, a robotic system is provided and includes a support structure, a movable platform, a universal-prismatic-universal serial chain, motors, a sensor and a control module. The universal-prismatic-universal serial chain directly or indirectly connects a center of the movable platform to the support structure. The outer serial chains are disposed radially outward of the universal-prismatic-universal serial chain Each of the outer serial chains is a prismaticuniversal-spherical serial chain. Each of the outer serial chains connects the movable platform to the support structure. The motors are connected to the outer serial chains. The sensor is connected to the movable platform and configured to detect at least one of force or torque applied by a human operator on the movable platform and generate a signal indicative of the at least one of force or torque applied. The control module is configured to control the motors based on the signal to assist the human operator in at least one of moving or rotating the movable platform.

In other features, the universal-prismatic-universal serial chain includes a first universal joint, a linear sliding shaft, and a second universal joint.

In other features, each of the outer serial chains comprise a linear slider, a universal joint, a bar and a spherical joint.

In other features, a robotic system is provided and includes a support structure, a movable platform, a universal-prismatic-universal serial chain, revolute-universal-spherical serial chains, motors, a sensor, and a control module. The universal-prismatic-universal serial chain directly or indirectly connects a center of the movable platform to the support structure. The revolute-universal-spherical serial chains are disposed radially outward of the universal-prismatic-universal serial chain. Each of the revolute-universal-spherical serial chains connects the movable platform to the support structure. The motors are connected to the revolute-universal-spherical serial chains. The sensor is connected to the movable platform and configured to detect at least one of force or torque applied by a human operator on the movable platform and generate a signal indicative of the at least one of force or torque applied. The control module is configured to control the motors based on the signal to assist the human operator in at least one of moving or rotating the movable platform.

In other features, the universal-prismatic-universal serial chain includes a first universal joint, a linear sliding shaft, and a second universal joint.

In other features, each of the revolute-universal-spherical serial chains includes a revolute joint, a first bar, a universal joint, a second bar and a spherical joint.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 14 is a top perspective view of a center serial chain of the 6-DOF robotic system of FIG. 11;

FIG. 15 is a bottom perspective view of a center serial chain of the 6-DOF robotic system of FIG. 11;

In the drawings, reference numbers may be reused to identify similar and/or identical elements.

DETAILED DESCRIPTION

Figure 1:
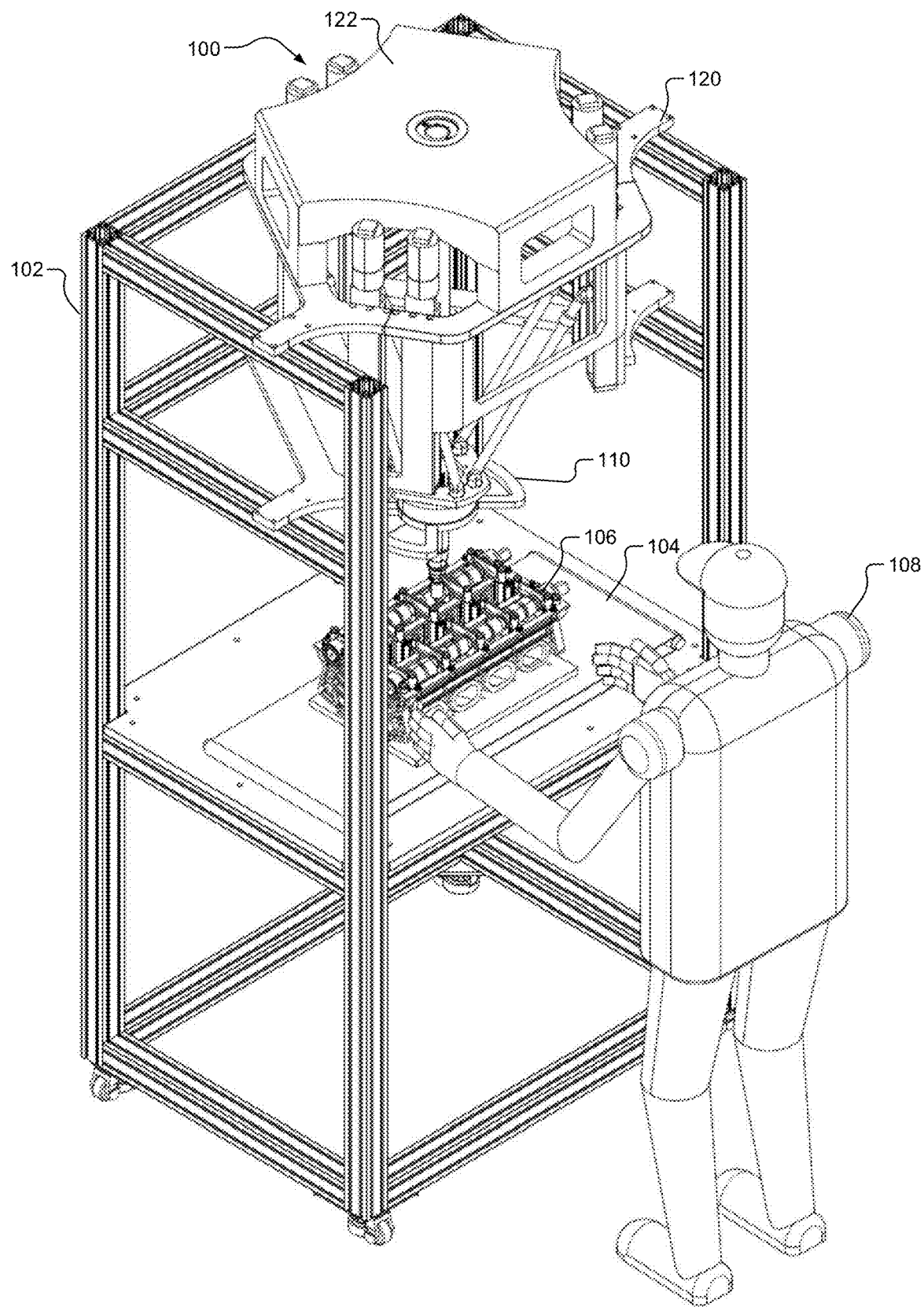
FIG. 1 is a front perspective view of an example of a six degree-of-freedom (6-DOF) robotic system mounted on a stand in accordance with the present disclosure.
Figure 2:
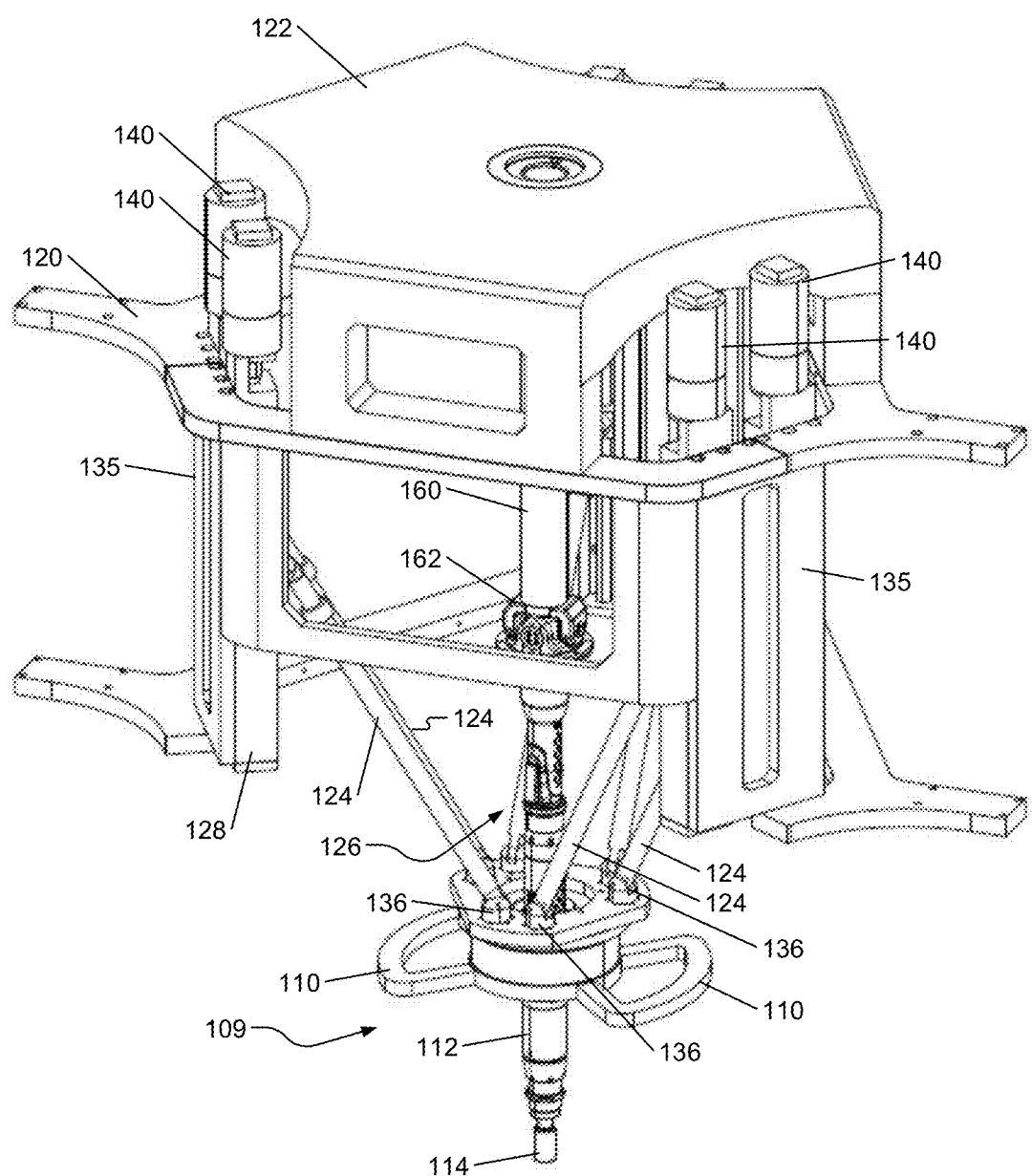
FIG. 2 is a top front perspective view of the 6-DOF robotic system of FIG. 1.

Fully automated robotic systems typically include controllers, motors, arms, end effectors, sensors, etc. for automatically positioning, setting, attaching and/or fastening components. No human interaction is involved. Each of the fully automatic robotic systems are application limited, complex, expensive and require a considerable amount of space.

The examples set forth herein include 6-DOF and 3-DOF robotic systems (referred to as the "robotic systems") that are automatic and/or collaborative. Fastening operations may be performed automatically and/or collaboratively. The robotic systems utilize human senses and intelligence to ensure fast and accurate fastening at the beginning of an operation while leaving the majority of operations with the robotic system alone. The robotic systems include platforms that are moveable by a human system operator with little resistance and include fastening tools that once positioned perform fastening operations without aid of the system operator. The robotic systems have high payload capability and are low cost and flexible, such that each robotic system is applicable to many different devices and components. The disclosed robotic systems may be used on various vehicle and non-vehicle systems, assemblies, devices, etc. The robotic systems may be used on, for example, vehicle systems, vehicle sub-systems, engines, instrument panels, wheels, doors, panels, etc. Although the following robotic systems are shown in FIGS. 1-24 in a vertical upright arrangement. The robotic systems may be arranged at angles, horizontally, and upside down.

FIGS. 1-8 show a 6-DOF robotic system 100 mounted on a stand 102. The stand 102 includes a platform (or table) 104 that supports a device (e.g., an engine) 106 set thereon. Although the device 106 is shown, other worked on objects may be disposed on the platform 104. An operator 108 stands in a front open area of the stand 102 and may move a lower end 109 of the 6-DOF robotic system 100 to set a fastener on the device 106. The operator 108 may move the lower end 109 via handles 110 to move a fastening tool (e.g., a nut runner) 112 having a fastener holding tip 114 to the location on the device 106 where the fastener is to be attached and fastened to the device 106. The fastening tool 112 may hold various fastener holding tips for various types and styles of fasteners. Each fastener holding tip may be adjustable for different types and styles of fasteners.

The 6-DOF robotic system 100 includes a frame 120 that has a top plate 122 and is supported by the stand 102, six prismatic-universal-spherical serial chains (referred to as the outer serial chains) 124, and a center universal-prismatic-universal serial chain (referred to as the center serial chain) 126.

Figure 3:
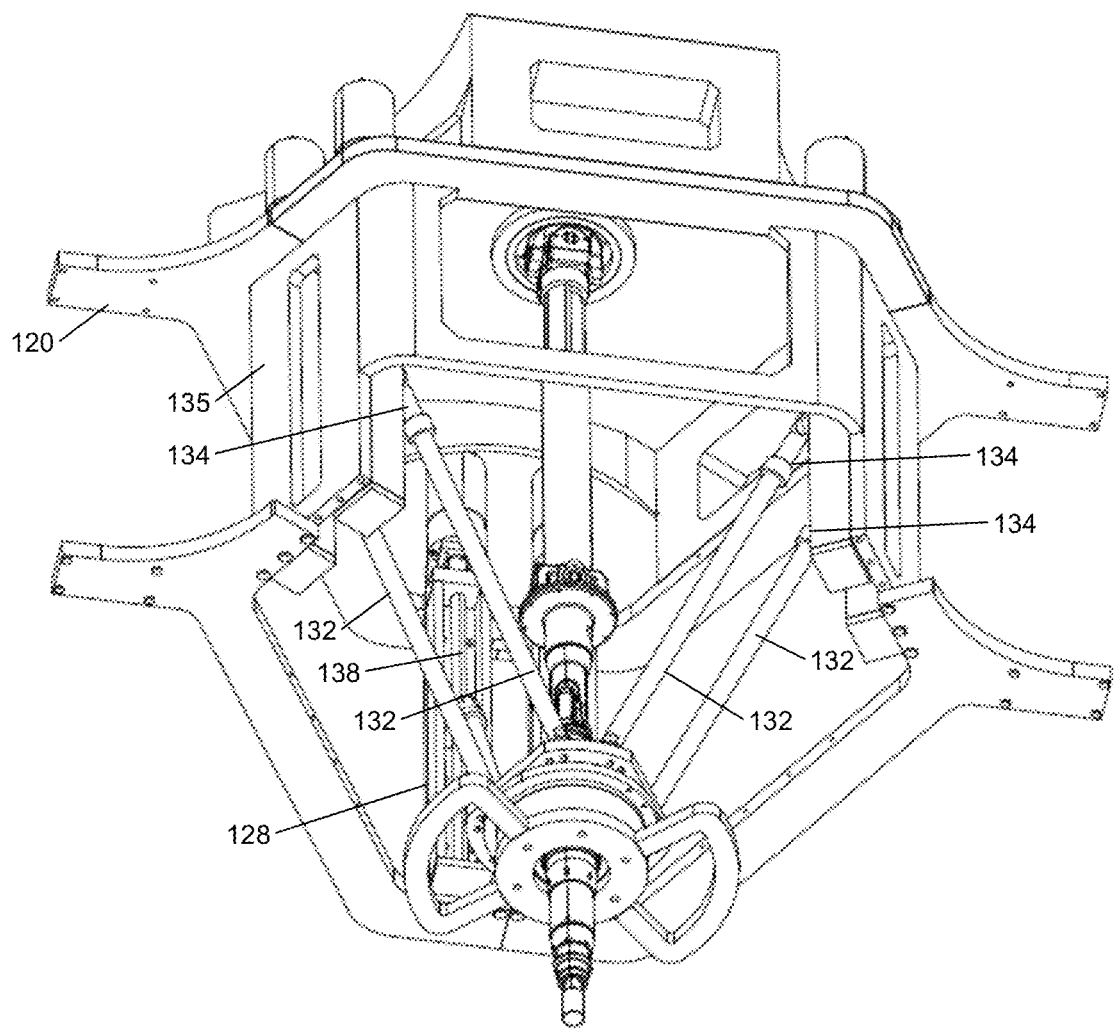
FIG. 3 is a bottom front perspective view of the 6-DOF robotic system of FIG. 1.
Figure 4:
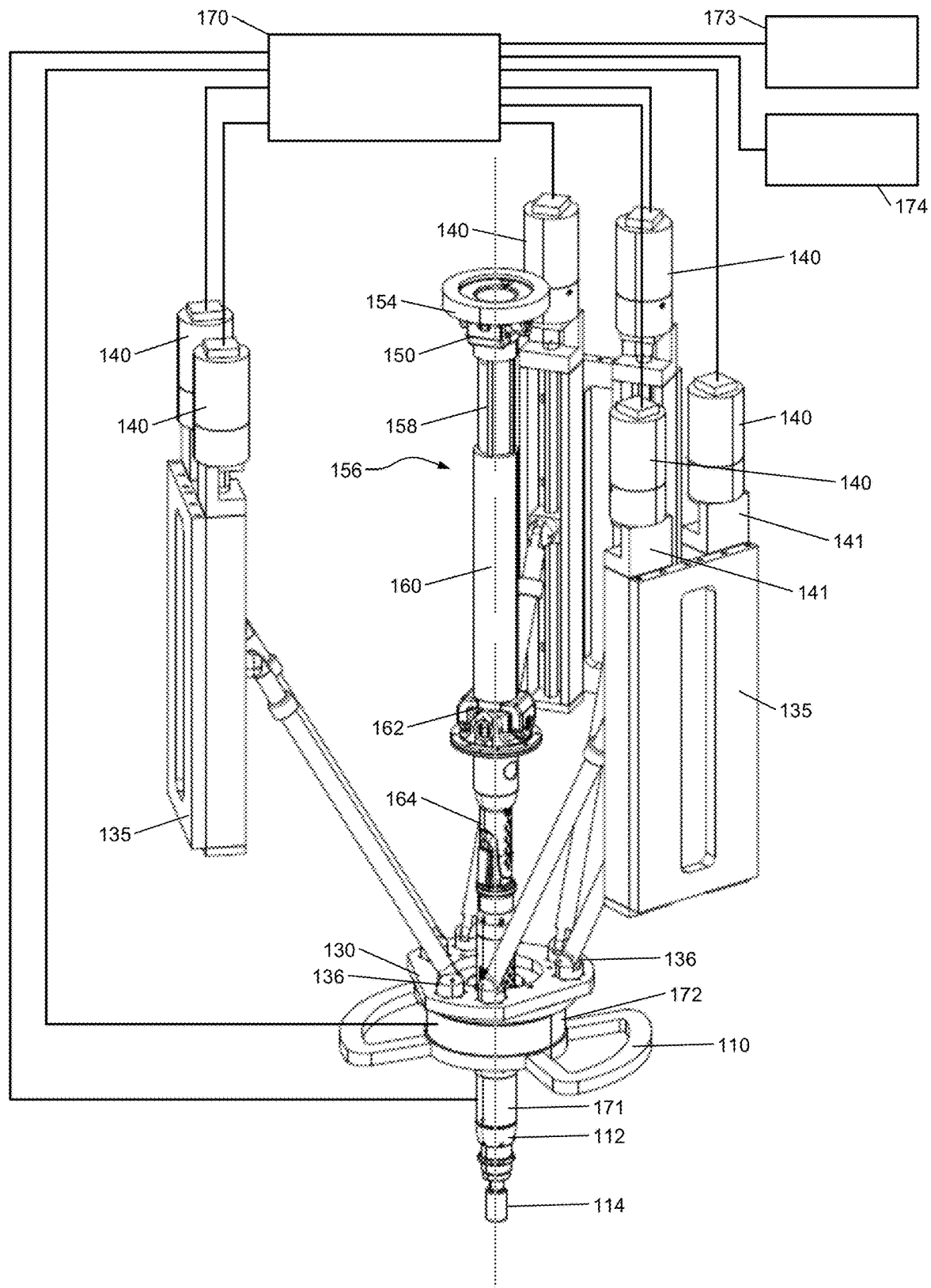
FIG. 4 is a top perspective view of a portion of the 6-DOF robotic system of FIG. 1 without a supporting frame.
Figure 5:
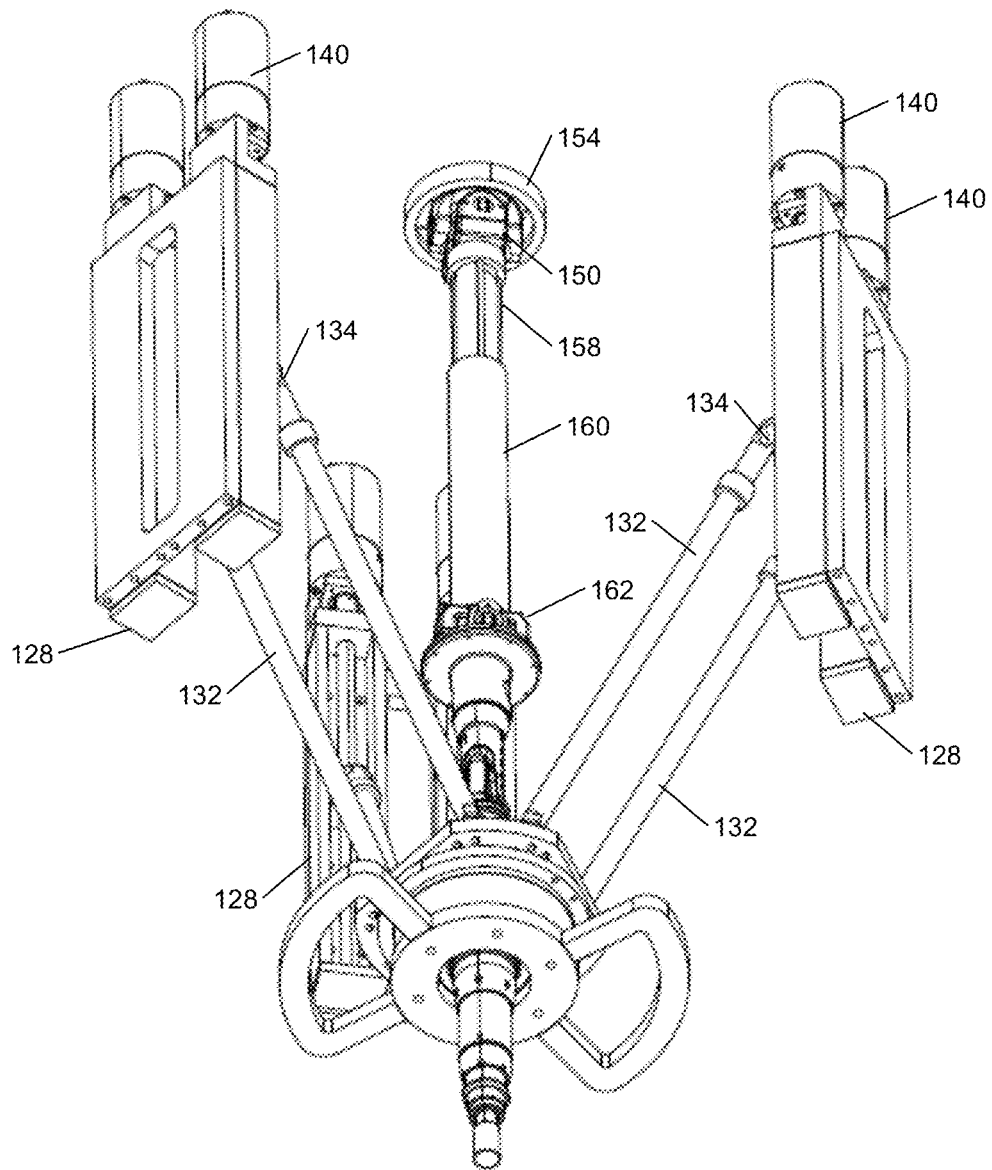
FIG. 5 is a bottom perspective view of a portion of the 6-DOF robotic system of FIG. 1 without a supporting frame.
Figure 6:
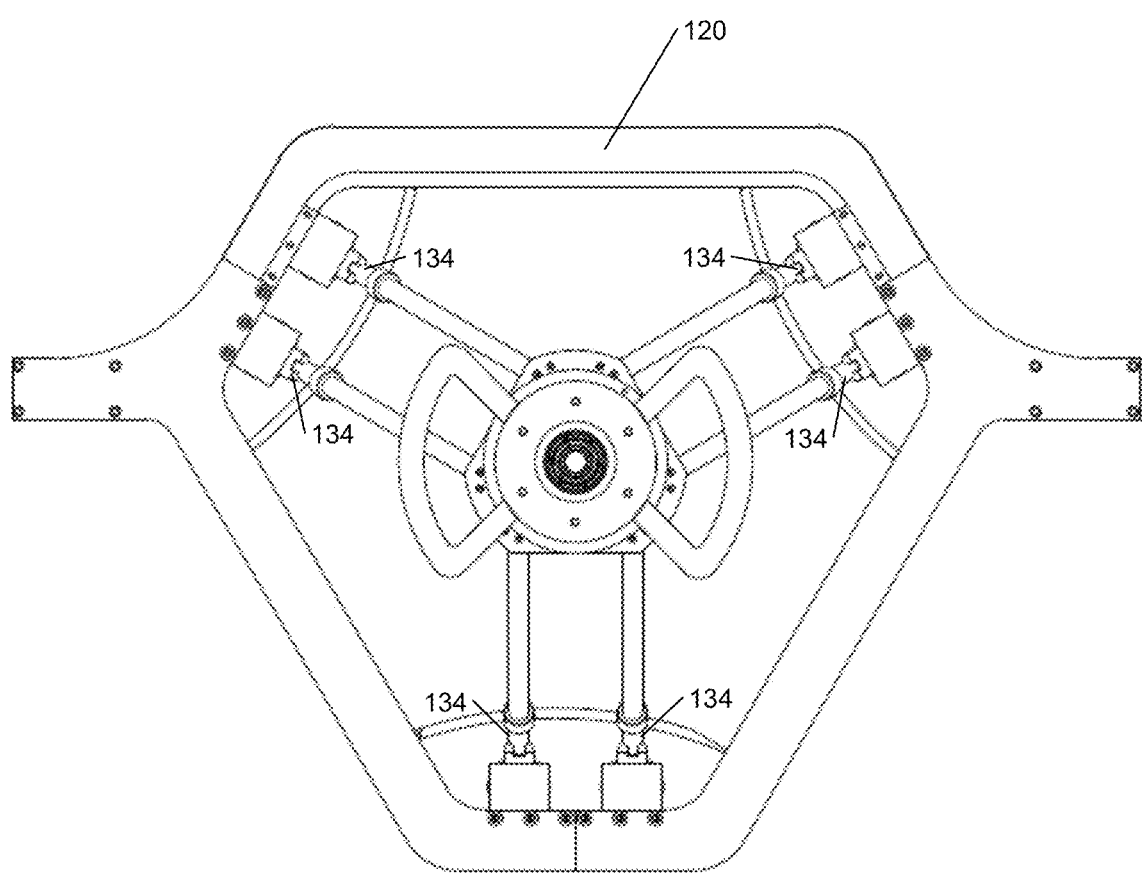
FIG. 6 is a bottom view of the 6-DOF robotic system of FIG. 1.
Figure 7:
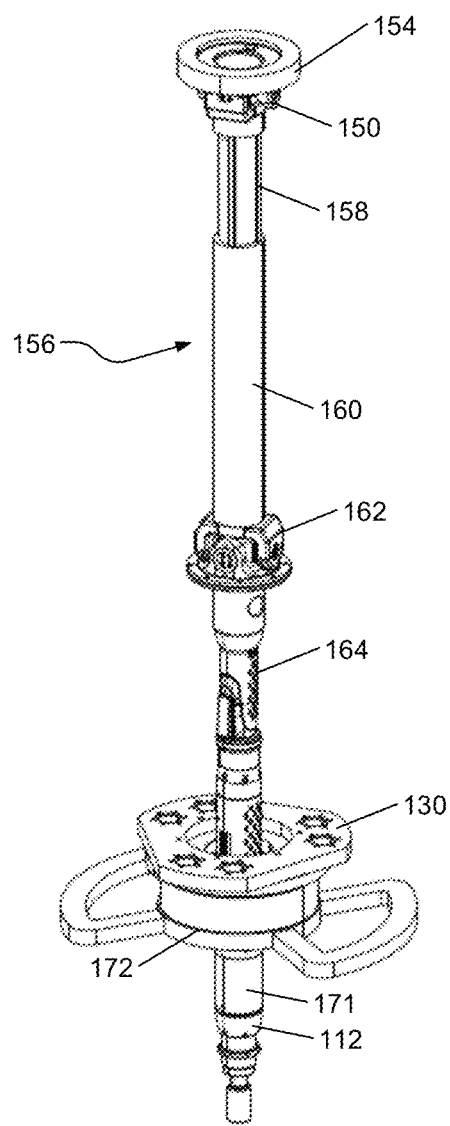
FIG. 7 is a top perspective view of a center serial chain of the 6-DOF robotic system of FIG. 1.
Figure 8:
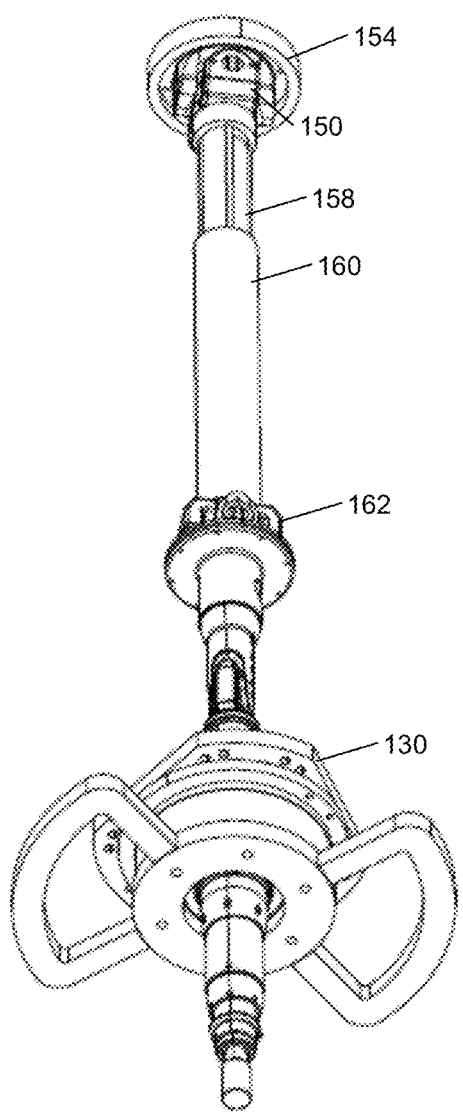
FIG. 8 is a bottom perspective view of a center serial chain of the 6-DOF robotic system of FIG. 1.

The six outer serial chains 124 include three pairs of chains. The chains of each pair may be connected in parallel or not. For example, if the tool is used to work on a nut that is not on a flat surface, the two links on a pair of chains might be twisted (spatially) relatively to each other. The six outer serial chains 124 include six linear sliders 128 mounted on the frame 120 and attached to a movable platform 130 via six bars (or links) 132. The bars 132 are attached to the linear sliders 128 via universal joints 134, each having 2-DOF. The linear sliders 128 are attached to three vertical plates 135, which are attached to the frame 120. The bars 132 are attached to the platform 130 via spherical joints 136, which have 3-DOF. Each of the linear sliders 128 may include a respective ball screw (one ball screw 138 is shown in FIG. 3) that is rotated by a respective rotary motor (rotary motors 140 are shown). The rotary motors 140 are attached to the linear sliders 128 via brackets 141. The term "prismatic-universal-spherical" refers to the linear sliders 128, the universal joints 134, and the spherical joints 136. The linear slider 128 may be referred to as a prismatic joint. The six outer serial chains 124 provide six individually driven serial chains for 6-DOF motion control.

The center serial chain 126 may be directly or indirectly coupled to the frame 120 and/or the stand 102 and/or other supporting structure, such as the top plate 122. The center serial chain 126 includes: a first universal joint 150 mounted to the top plate 122 via a coupling 154; a linear telescopic sliding shaft (or first shaft) 156 including an inner member 158 and an outer member 160; a second universal joint 162; a second shaft 164; the platform 130; and the fastening tool (e.g., a nut runner) 112. The term "universal-prismatic-universal" or "UPU" refers to the first universal joint 150, the first shaft 156, and the second universal joint 162. The first shaft 156 may be referred to as a prismatic joint. The second universal joint 162 is in alignment with the first universal joint 150, such that the axis along the pair of forks of the first universal joint 150 mounted on the first shaft 156 (on inner member 158) is parallel to the axis along the pair of forks of the second universal joint 162 mounted on the first shaft 156 (on outer member 160). The center serial chain 126 is able to extend or retract due to the first shaft 156, where the outer member 160 is free to slide relative to the inner member 158, which allows vertical movement of the platform 130. The center chain (or the UPU chain) provides 5DOF, where the rotational motion around the chain axis (vertical axis at the initial position) is limited. This allows the chain to counter the twist torque of the nutrunner when in passive mode, or transfer torque to the tip end when in active mode. When in active mode, a motor may be implemented behind the first U joint. The flange of the motor is fixed on the top plate. The motor shaft is connected to the first U joint via a coupling. The center serial chain 126 allows for 6-DOF motion while in an active state and applying torque only. More specifically, the $6^{th}$ DOF is provided when driving actively, where the first universal joint is able to rotate by the driving motor and the other 5DOF are provided when using the center serial chain for torque transferring and resistance. In the 5DOF case, the first universal joint is locked from rotations, thus one less DOF. The universal joints 150, 162 resist and/or counteract torque associated with running the fastening tool 112.

The platform 130 is held in place by the six outer serial chains (or legs) 124 and the center serial chain (or leg) 126 and is able to be moved with little resistance by an operator via the handles 110. A control module 170 is connected to the rotary motors 140 of the linear sliders 128, a motor 171 of the fastening tool 112, and a sensor 172 and controls positioning of the platform 130 and thus the fastening tool 112 relative to the frame 120, the supporting platform 104, and the device 106. The control module 170 may detect force applied on the handles 110 via the sensor 172 and in response provide active compliance by assisting an operator 108 in movement of the platform 130 in the direction of the applied force based on feedback from the sensor 172. The platform 130 may be moved in x, y, z directions and may be tilted about the x, y, z axes.

In an embodiment, the 6-DOF system 100 operates as a collaborative system by which (i) sensing, movement of the platform 130 to a start position, and closed loop feedback is provided by the operator 108, and (ii) sensing, movement of the platform 130 to a start position, and fastening (or torqueing down) a fastener is performed by the robotic system 100. In one embodiment, the operator 108 attaches a fastener to the tip of the fastening tool 112, moves the platform 130 with the assistance of the robotic system 100 to a start position, indicates to start fastening the fastener, and waits to hear and/or see a completion indication. The indication to start fastening may be provided by the operator 108 touching an input device 173, such as a start button on the platform 130 or elsewhere. The input device 173 may be located on the robotic system 100, the stand 102, or elsewhere. The completion indication may be provided by an indicator 174. The indicator 174 may include a light, a speaker, a clicking device configured to generate a "click" sound when a predetermined torque level has been reached on the corresponding fastener, a message on a display, etc. In one embodiment, the fastening tool 112 generates the click sound when a fastener has been torqued down to the predetermined level. In another embodiment, the control module 170 automatically controls initial positioning of the fastening tool to set fastening locations and fastening of fasteners.

The control module 170 controls operation of the rotary motors 140 and the motor 171 of the fastening tool 112 based on feedback from the sensor 172. The sensor 172 may be mounted to the platform 130 as shown and provides feedback to the control module 170. In one embodiment, the sensor 172 is a 6-dimensional force and torque sensor that measures force and torque exerted on the platform 130 by the operator 108 and the fastening tool 112. The sensor 172 measures forces and torques in Cartesian coordinate directions (x, y, z) and corresponding angular torques about the x, y, z axes.

Figure 9:
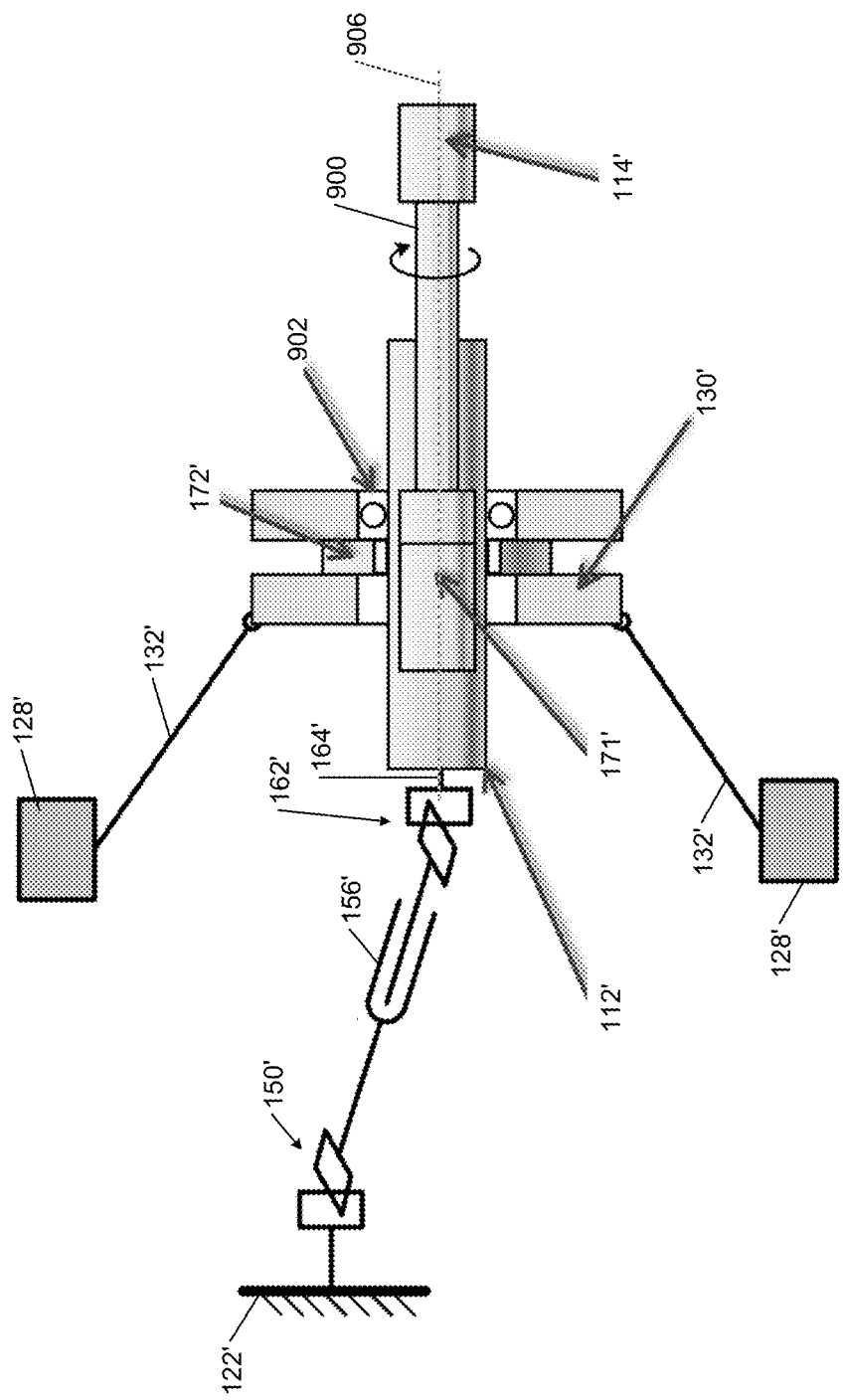
FIG. 9 is a side block representative view of the center serial chain of FIGS. 7-8.

FIG. 9 shows a block representative view of the center serial chain 126 of FIGS. 1-8 (referred to as the center serial chain 126'). The center serial chain 126' includes: the first universal joint 150' mounted to the top plate 122'; the linear telescopic sliding shaft (or first shaft) 156'; the second universal joint 162'; the second shaft 164'; the platform (or end effector) 130'; and the fastening tool (e.g., a nut runner) 112' with tip 114'. FIG. 9 shows the case when the center chain is used passively resisting the fastening torque from the torque gun mounted center of 130. The first universal joint 150' may also be driven by a torque generator/wrench from top plate 122' if used to actively provide fastening torque from the top, as further described below). The fastening tool 112' includes motor 171' that rotates a shaft 900, which in turn rotates the tip 114'. In the example shown, the fastening tool 112' extends through the platform 130', the sensor 172', and rides on a bearing 902 mounted in the platform 130'. The platform 130' may include two plates with the sensor 172' disposed between and in contact with the two plates, as shown. Platform 130' is connected to linear sliders 128' via bars 132'. The universal joints 150', 162' are aligned with each other as described above. The universal joints 150', 162' resist and/or counteract torque associated with running the fastening tool 112'. The outer serial chains 124 associated with the bars 132' do not resist and/or counteract torque associated with running the fastening tool 112' due to the bearing 902, which allows the fastening tool 112' to rotate relative to the platform 130' and an axis of rotation 906. The fastening tool 112' is separated from the platform 130' by the bearing 902.

Figure 10:
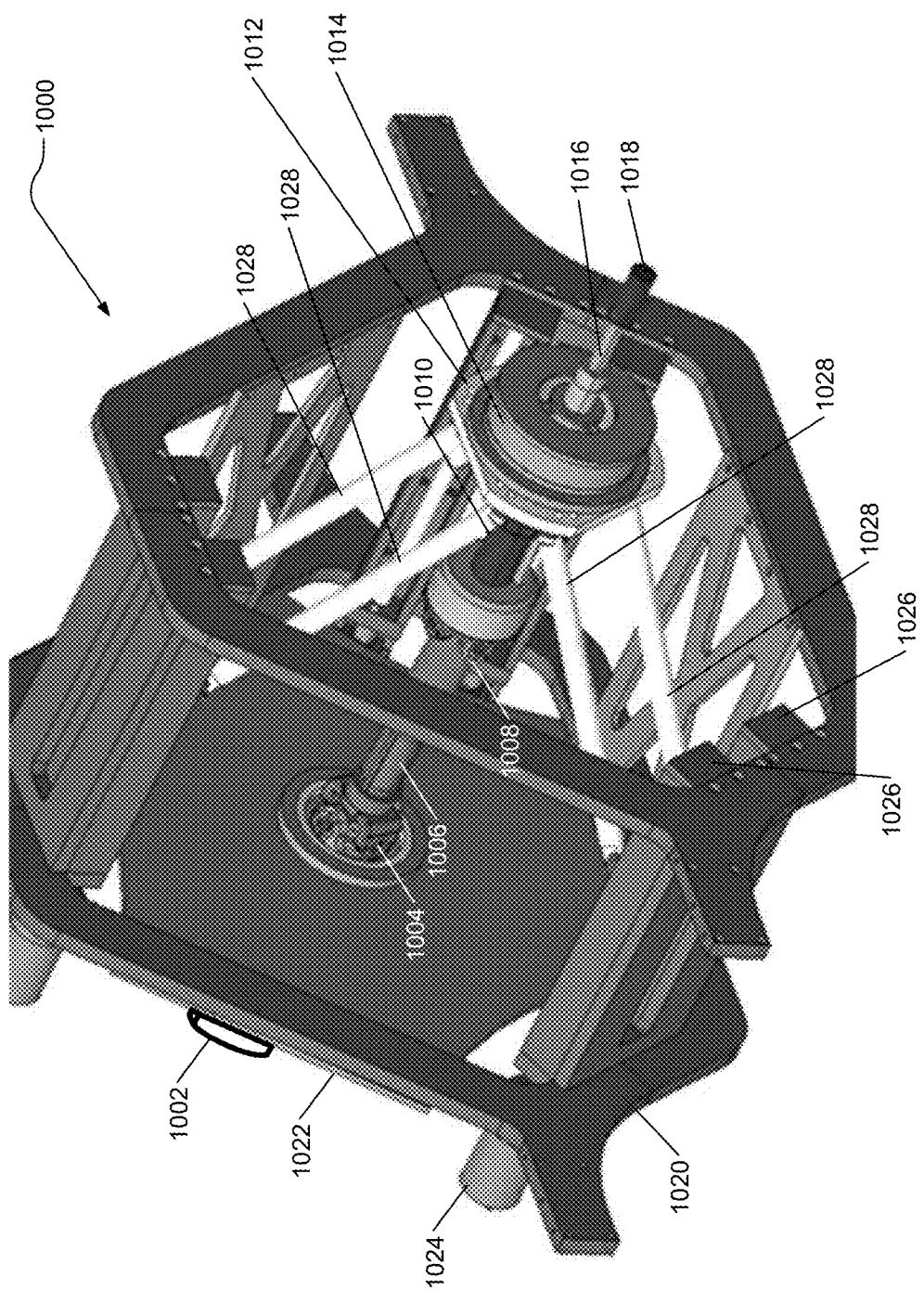
FIG. 10 is a bottom perspective view of a 6-DOF robotic system including a top mounted fastening motor in accordance with the present disclosure.
Figure 11:
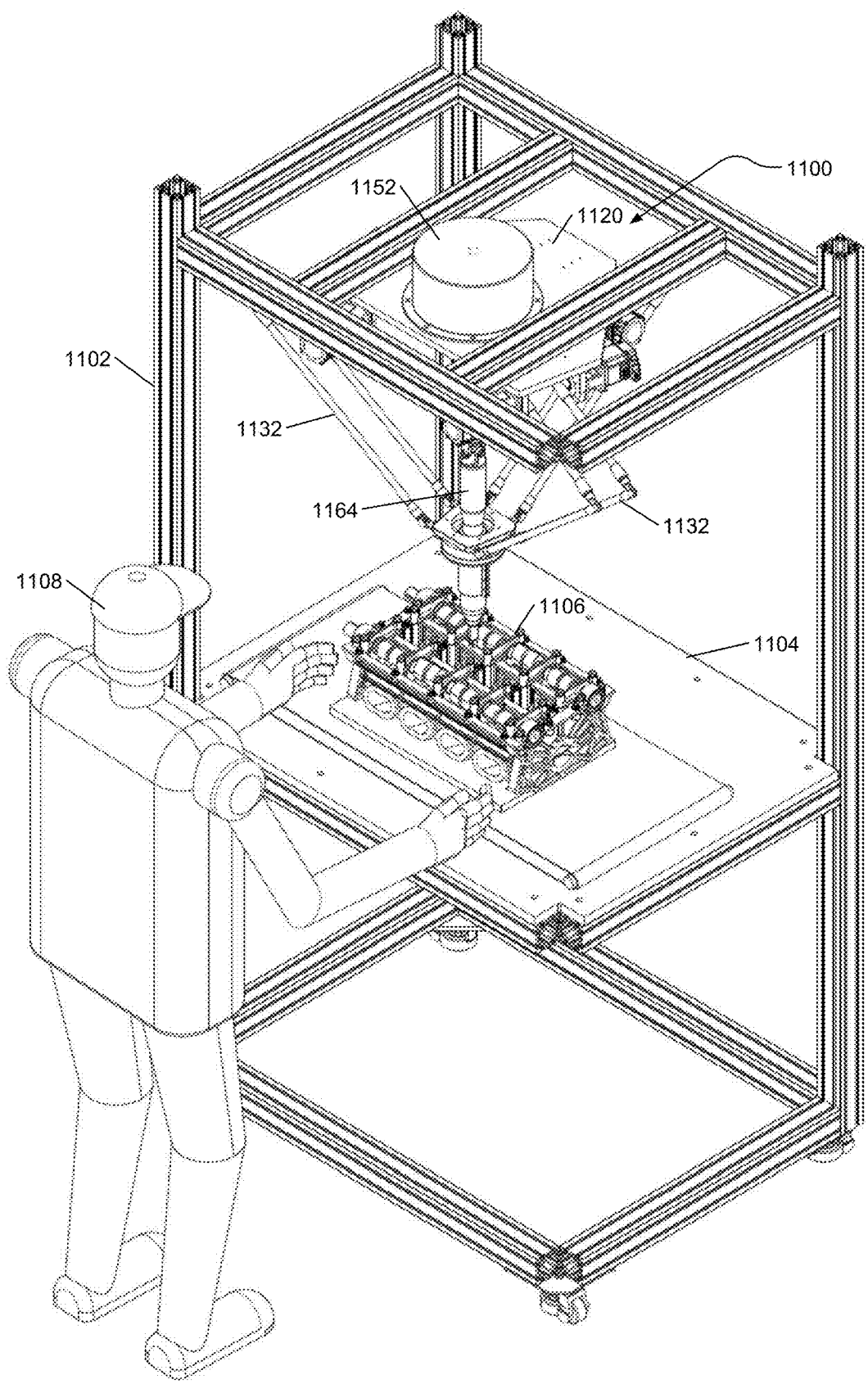
FIG. 11 is a front perspective view of an example of a 6-DOF robotic system mounted on a stand and including six motors for rotating six bars in accordance with the present disclosure.
Figure 12:
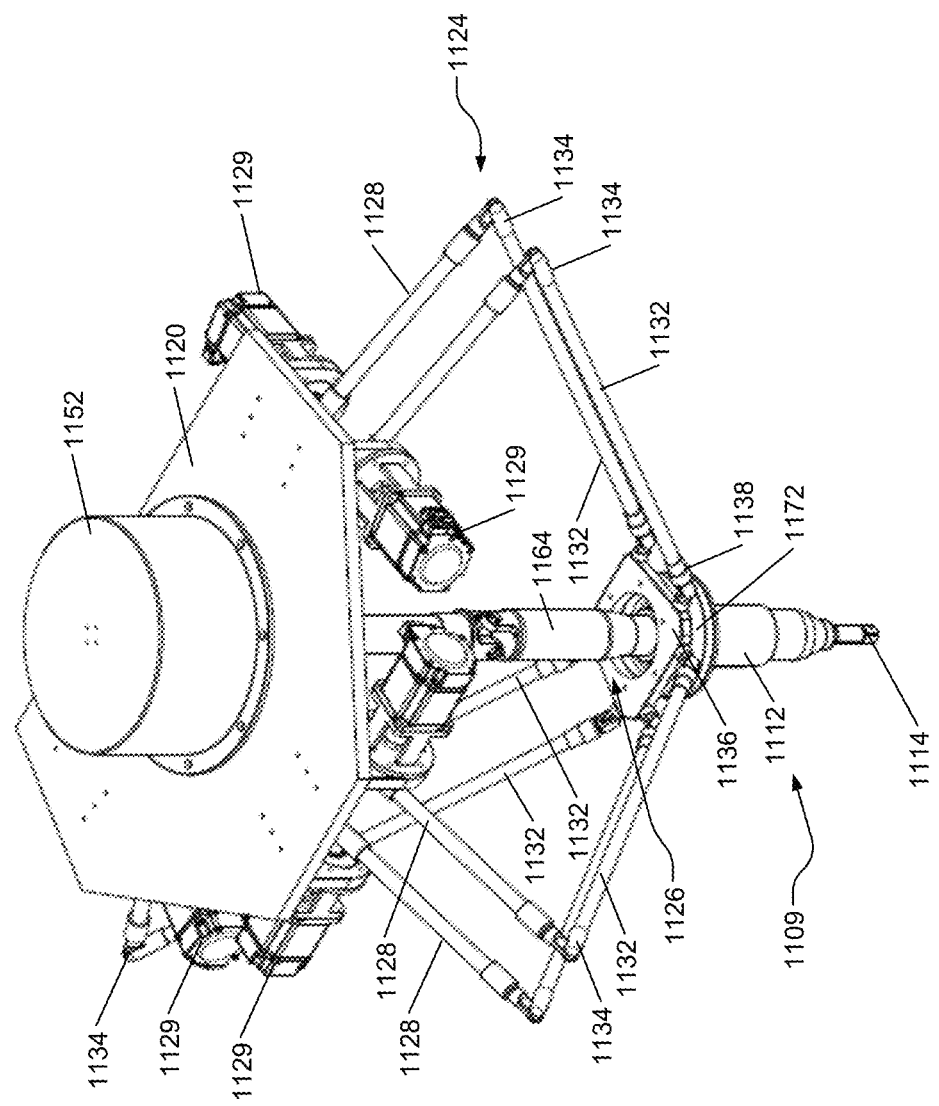
FIG. 12 is a top rear perspective view of the 6-DOF robotic system of FIG. 11.
Figure 13:
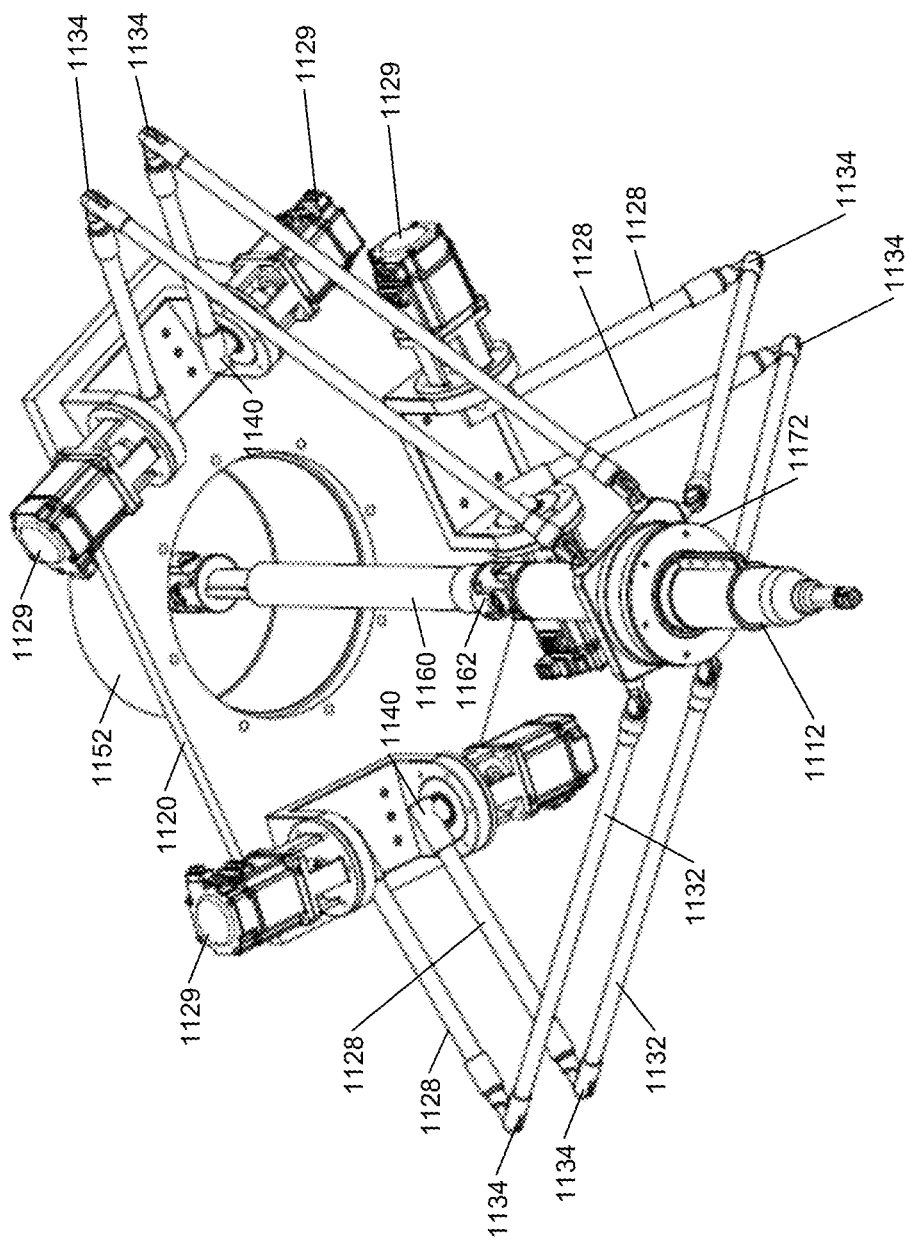
FIG. 13 is a bottom front perspective view of the 6-DOF robotic system of FIG. 11.
Figure 16:
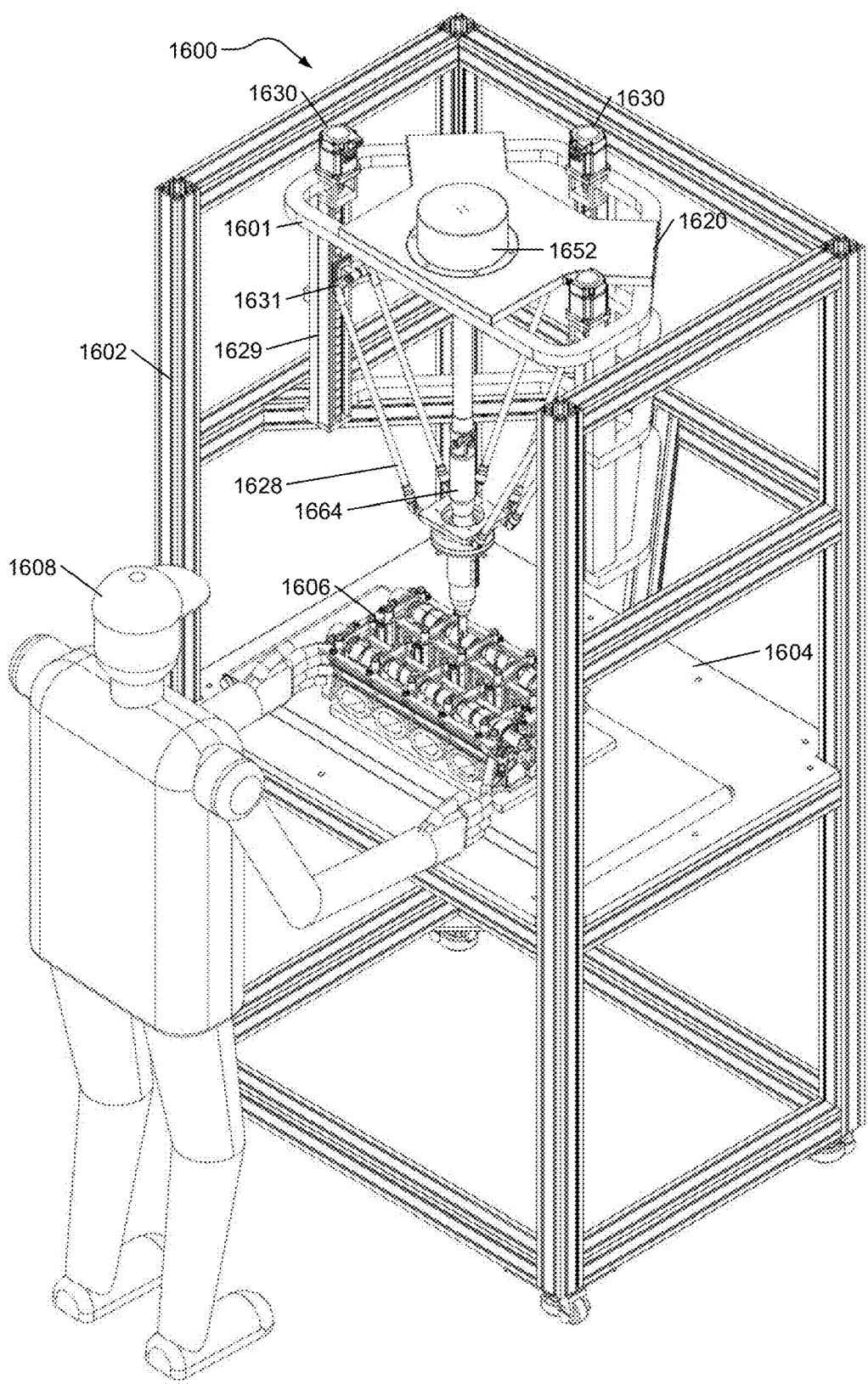
FIG. 16 is a front perspective view of an example of a 3-DOF robotic system mounted on a stand and including three rotary motors in accordance with the present disclosure.
Figure 17:
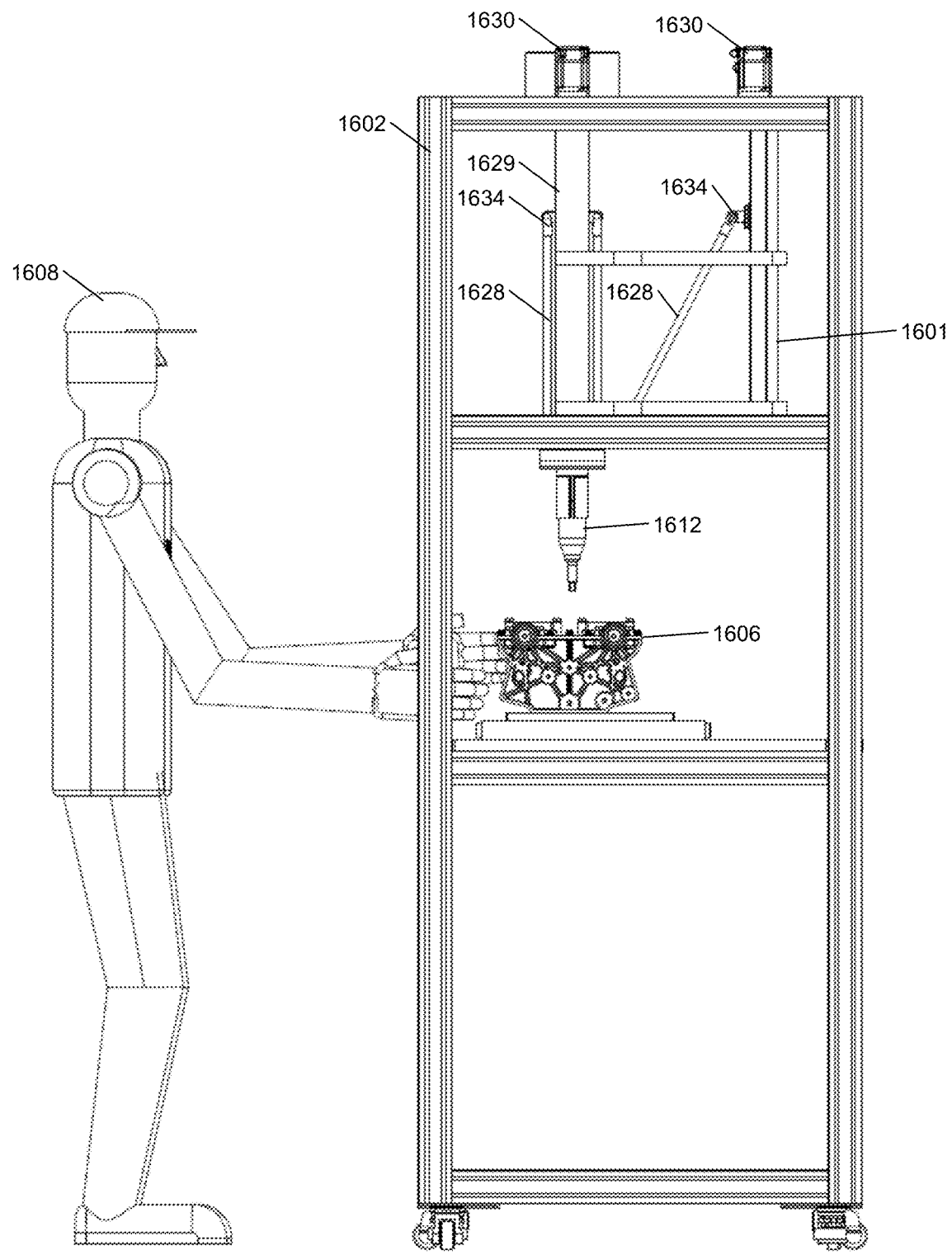
FIG. 17 is a side view of the 3-DOF robotic system and stand of FIG. 16.
Figure 18:
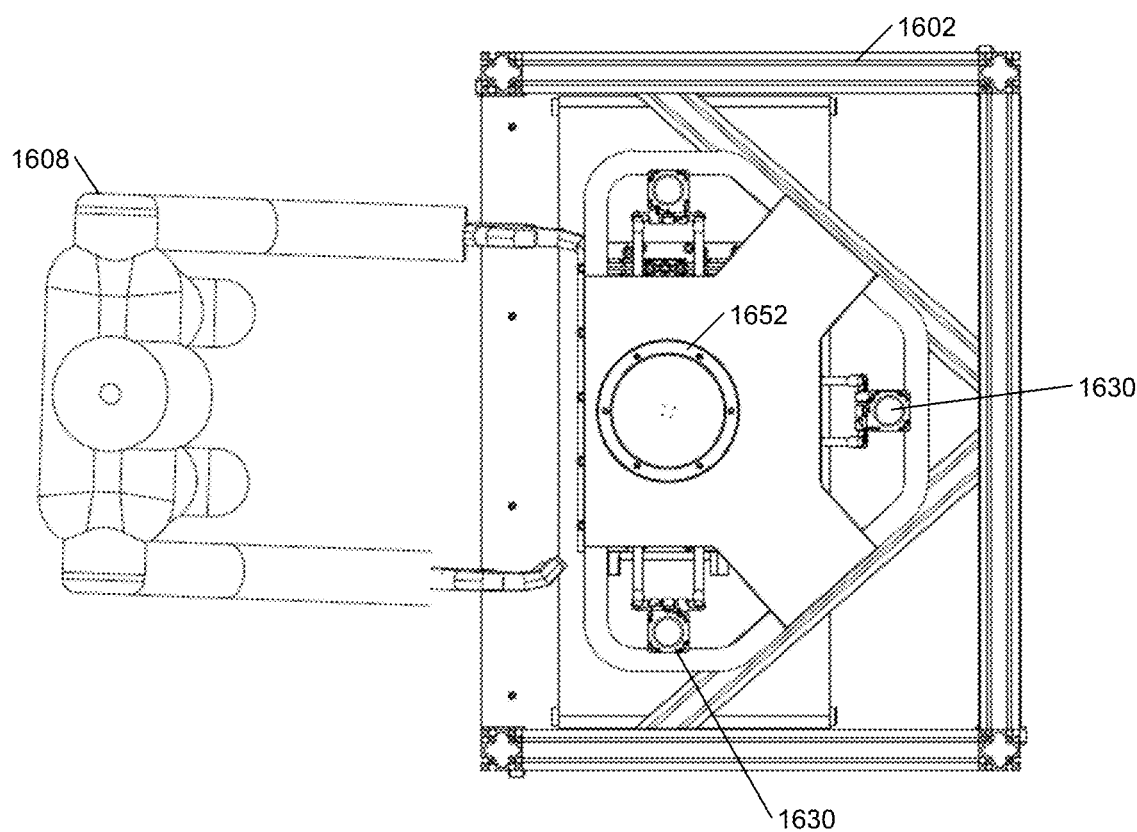
FIG. 18 is a top view of the 3-DOF robotic system and stand of FIG. 16.
Figure 20:
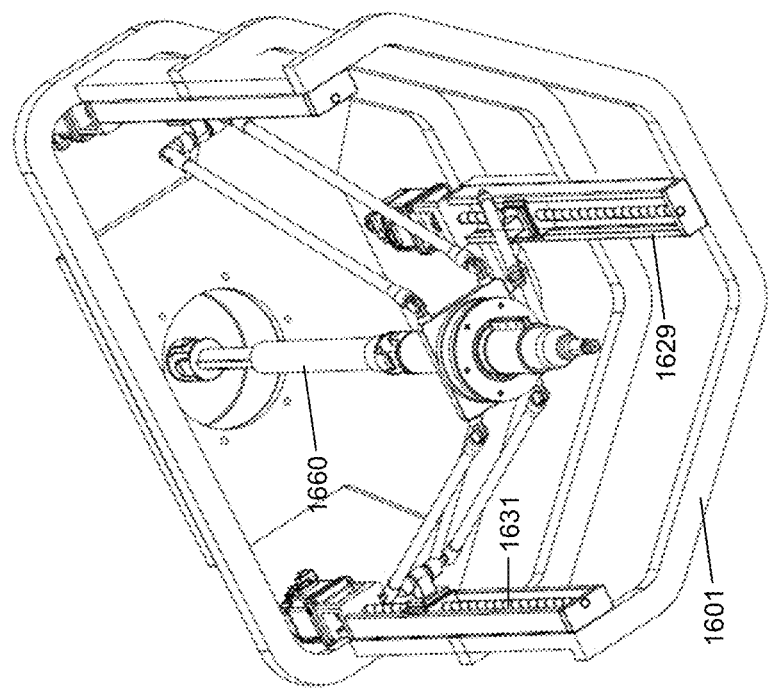
FIG. 20 is a bottom front perspective view of the 3-DOF robotic system of FIG. 16.
Figure 19:
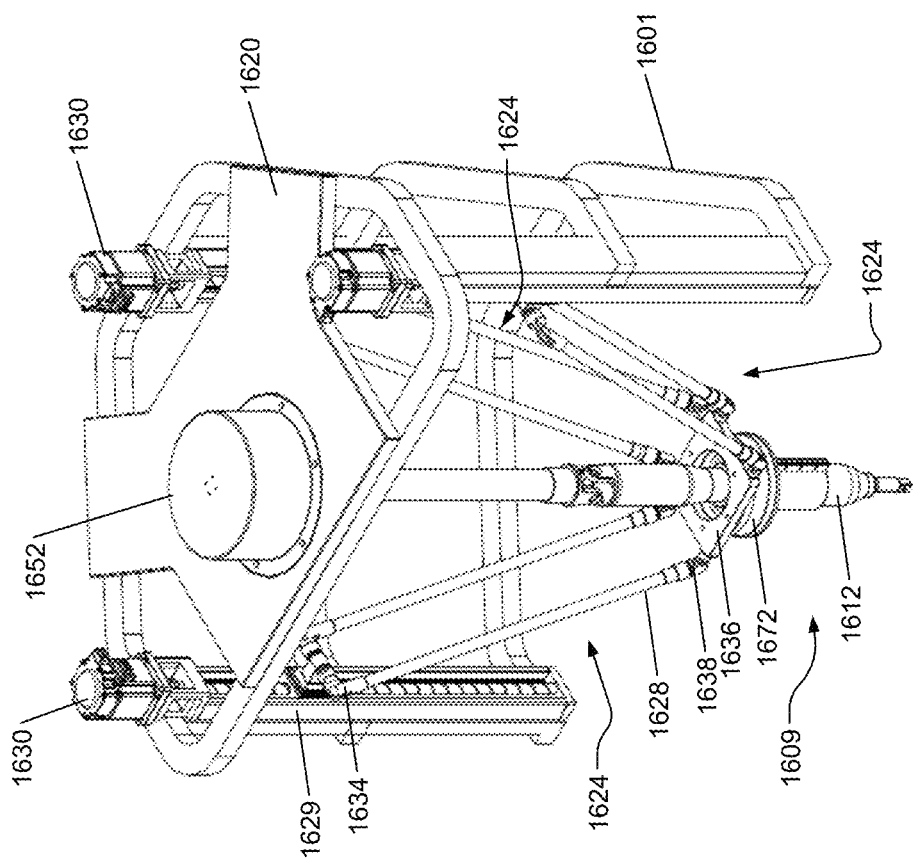
FIG. 19 is a top front perspective view of the 3-DOF robotic system of FIG. 16.
Figure 22:
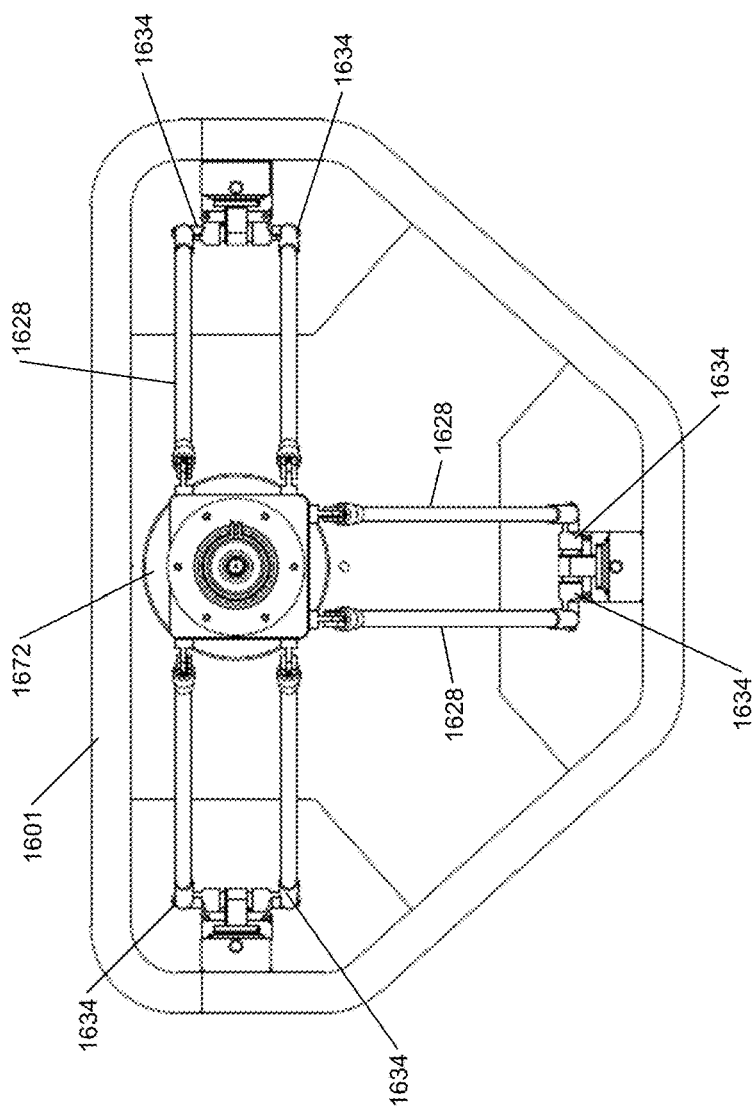
FIG. 22 is a bottom view of the 3-DOF robotic system of FIG. 16.
Figure 21:
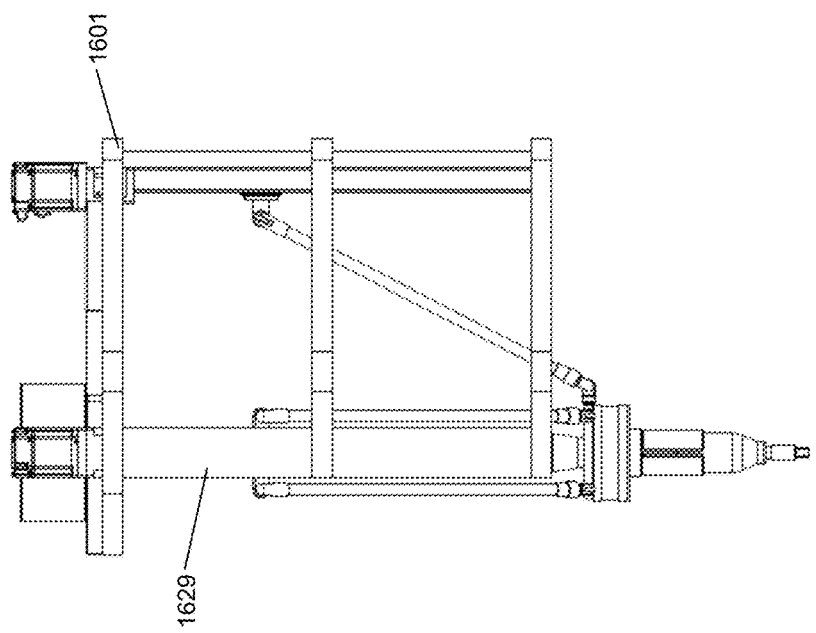
FIG. 21 is a side view of the 3-DOF robotic system of FIG. 16.
Figure 23:
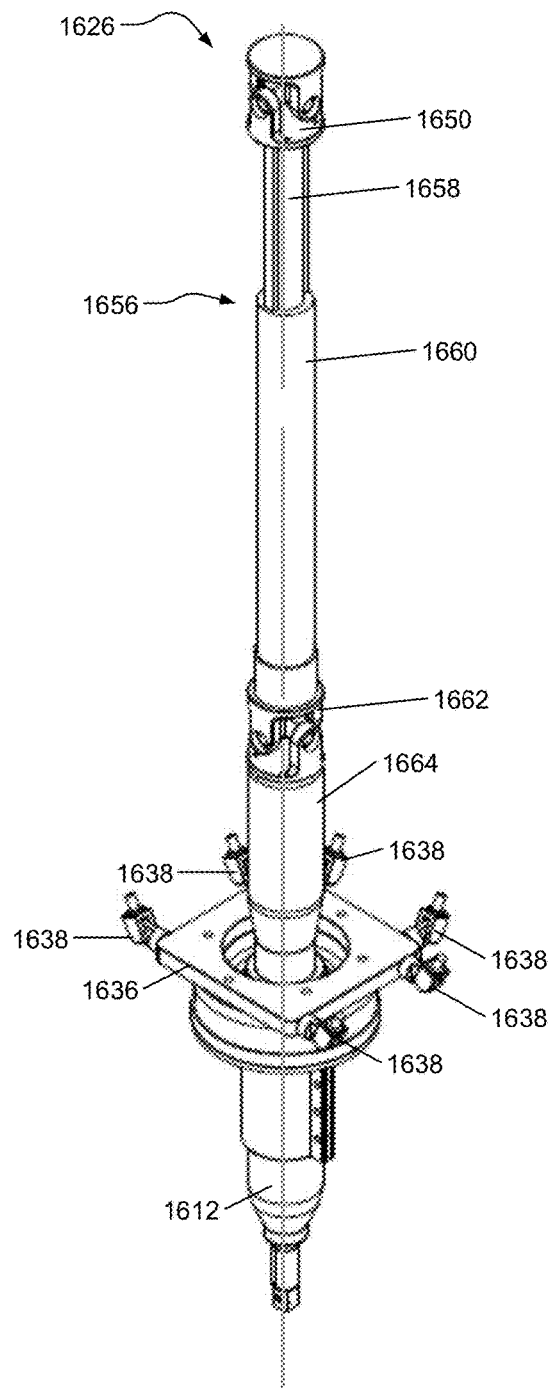
FIG. 23 is a top perspective view of a center serial chain of the 3-DOF robotic system of FIG. 16.
Figure 24:
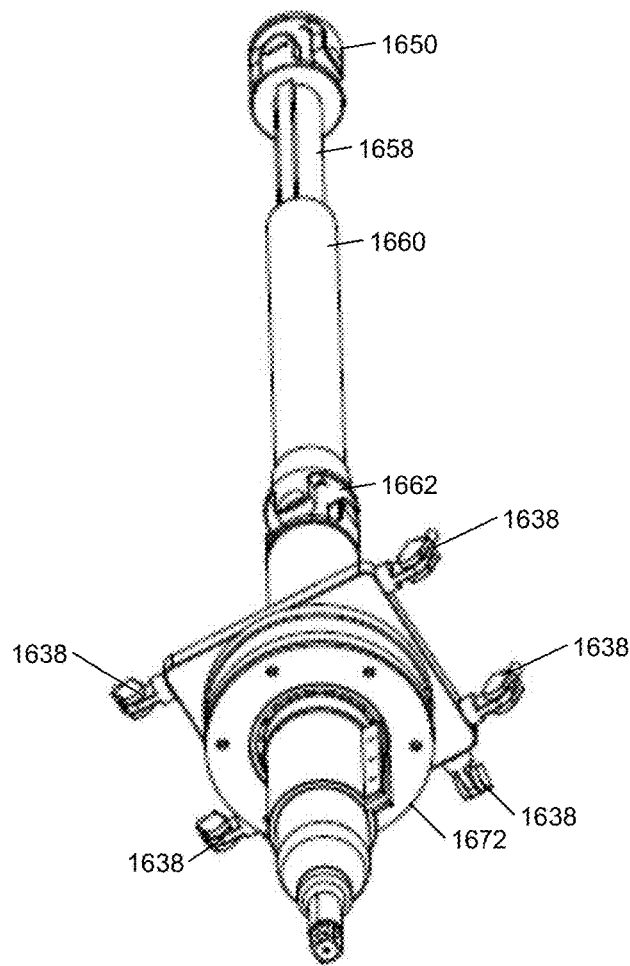
FIG. 24 is a bottom perspective view of a center serial chain of the 3-DOF robotic system of FIG. 16.

FIG. 10 shows a 6-DOF robotic system 1000 that is similar to the 6-DOF robotic system 100 of FIGS. 1-8, except instead of including a fastening tool attached near the tip of the center serial chain, a top mounted fastening motor 1002 is included. The top mounted fastening motor 1002 is attached to a first universal joint 1004, which is attached to a prismatic joint (or first shaft) 1006. The first shaft 1006 may include inner and outer members similar to the members 158, 160 of FIGS. 1-8. The prismatic joint 1006 is attached to a second universal joint 1008, which is attached to a second shaft 1010. The second shaft 1010 is attached to a platform 1012, which includes a sensor 1014. The sensor 1014 may be configured and operate similarly as the sensor 172 of FIGS. 1-8. The second shaft 1010 rotates the end shaft 1016 that is connected to a tip 1018.

The 6-DOF robotic system 1000 also includes a frame 1020, a top plate 1022, rotary motors 1024 that actuate linear sliders 1026, which in turn move bars 1028 of respective outer serial chains. The motors 1002, 1024 are controlled via a control module (e.g., the control module shown in FIG. 4) based on output of the sensor 1014.

Although the six outer serial chains are shown as including three pairs of outer serial chains, where each pair is positioned 120° apart from each other relative to the centerline 166, the pairs of outer serial chains may have different angles of separation. For example, two of the pairs may be 180° apart, where the third pair is 90° apart from the other two pairs. See, for example, the arrangement shown in FIGS. 11-13. By having two pairs 180° apart, the pairs of outer serial chains are out of the way and allow an operator to better access the device being worked on and the movable platform 130.

FIGS. 11-15 show a 6-DOF robotic system 1100 mounted on a stand 1102. The stand 1102 includes a platform (or table) 1104 that supports a device (e.g., an engine) 1106 set thereon. An operator 1108 stands in a front open area of the stand 1102 and may move a lower end 1109 of the 6-DOF robotic system 1100 to set a fastener on the device 1106. The operator 1108 may move the lower end 1109 to move a fastening tool (e.g., a nut runner) 1112 having a fastener holding tip 1114 to the location on the device 1106 where the fastener is to be attached and fastened to the device 1106.

The 6-DOF robotic system 1100 includes a top plate 1120 that is attached to the stand 1102, six revolute-universal-spherical serial chains (referred to as the outer serial chains) 1124, and a center universal-prismatic-universal serial chain (referred to as the center serial chain) 1126.

The six outer serial chains 1124 include six bars 1128 rotated by six rotary motors 1129 that are mounted to the top plate 1120. The six bars 1128 are attached to another six bars 1132 via universal joints 1134. The six bars 1132 are attached to a movable platform 1136 via spherical joints 1138. Each of the universal joints 1134 has 2-DOF motion. The spherical joints 1138 have 3-DOF motion.

The term "revolute-universal-spherical" refers to (i) the connections between the rotary motors 1129 and bars 1128, (ii) the universal joints 1134, and (iii) the spherical joints 1138. The connection of each pair of one of the rotary motors 1129 and one of the bars 1128 is a revolute joint 1140, which allows for a swinging motion of the bars 1128. The six outer serial chains 124 provide six individually driven serial chains for 6-DOF motion control.

The center serial chain 1126 includes a first universal joint 1150 mounted to a cap 1152. The cap 1152 is mounted to the top plate 1120. The center serial chain 1126 further includes: a linear telescopic sliding shaft (or first shaft) 1156 including an inner member 1158 and an outer member 1160; a second universal joint 1162; a second shaft 1164; the platform 1136; and the fastening tool (e.g., a nut runner) 1112. The term "universal-prismatic-universal" refers to the first universal joint 1150, the first shaft 1156, and the second universal joint 1162. The first shaft 1156 may be referred to as a prismatic joint. The second universal joint 1162 is in alignment with the first universal joint 1150, such that the axis along the pair of forks of the first universal joint 1150 mounted on the first shaft 1156 (on inner member 1158) is parallel to the axis along the pair of forks of the second universal joint 1162 mounted on the first shaft 1156 (on outer member 160). The center serial chain 1126 is able to extend or retract due to the first shaft 1156, where the outer member 1160 is free to slide relative to the inner member 1158, which allows vertical movement of the platform 1136. The center chain (or the UPU chain) provides 5DOF, where the rotational motion around the chain axis (vertical axis at the initial position) is limited. This allows the chain to counter the twist torque of the nutrunner when in passive mode, or transfer torque to the tip end when in active mode. When in active mode, a motor may be implemented behind the first U joint. The flange of the motor is fixed on the top plate. The motor shaft is connected to the first U joint via a coupling. The center serial chain 1126 allows for 6-DOF motion only in an active state and applying torque, while 5DOF are allowed in a passive state and countering driving torque of the fastening tool 1112. More specifically, 6DOF are provided when driving actively, where the first universal joint is able to rotate by the driving motor to provide an additional DOF and the other 5DOF are provided when using the center serial chain for torque transferring and resistance. In the 5DOF case, the first universal joint is locked from rotations, thus one less DOF. The universal joints 1150, 1162 resist and/or counteract torque associated with running the fastening tool 1112.

The platform 1136 is held in place by the six outer serial chains (or legs) 1124 and the center serial chain (or leg) 1126 and is able to be moved with little resistance by an operator. A control module (e.g., the control module 170 of FIG. 4) connected to the rotary motors 1129, a motor of the fastening tool 1112, and a sensor 1172 and controls positioning of the platform 1136 and thus the fastening tool 1112 relative to the stand 1102, the top plate 1120, the supporting platform 1104, and the device 1106. The control module may detect force applied on the platform 1136 via the sensor 1172 and in response assist the operator 1108 in movement of the platform 1136 in the direction of the applied force based on feedback from the sensor 1172. Thus, active compliance is provided as described above. The sensor 1172 may be configured and operate similarly as the sensor 172 of FIGS. 1-8. The platform 1136 may be moved in x, y, z directions and may be tilted about the x, y, z axes. The platform 1136 may include handles as described above for movement of the platform 1136.

The above-described 6-DOF robotic systems provide freedom of operations in different x, y, z positions and angles relative to the x, y, z axes. Parallel robot serial chains provide high load capacity and system rigidity. The outer serial chains may be arranged at various angles for improved operator access.

FIGS. 16-24 show a 3-DOF robotic system 1600 mounted on a stand 1602. The stand 1602 includes a platform (or table) 1604 that supports a device (e.g., an engine) 1606 set thereon. An operator 1608 stands in a front open area of the stand 1602 and may move a lower end 1609 of the 3-DOF robotic system 1600 to set a fastener on the device 1606. The operator 1608 may move the lower end 1609 to move a fastening tool (e.g., a nut runner) 1612 having a fastener holding tip 1614 to the location on the device 1606 where the fastener is to be attached and fastened to the device 1606.

The 3-DOF robotic system 1600 includes a frame 1601 that is attached to the stand 1602, a top plate 1620, three prismatic-universal-universal (PUU) serial chains (referred to as the outer serial chains) 1624, and a center universal-prismatic-universal serial chain (referred to as the center serial chain) 1626. Although described as PUU serial chains, the chains may be prismatic-universal-spherical (PUS) serial chains, where the last joint in each chain is a spherical joint rather than a universal joint. To provide the 3-DOF, universal joints may be used, however to make manufacturing and assembly of the robotic system 1600 easier spherical joints may be used.

The three outer serial chains 1624 include six bars 1628 attached to three linear sliders 1629, which are actuated by three rotary motors 1630 that are mounted to the top plate 1620. Three pairs of the six bars 1628 are attached to the three linear sliders 1629 (referred to as prismatic joints) via six universal joints 1634. Each pair of the bars 1628 are connected in parallel. The linear sliders 1629 may include respective ball screws 1631. The six bars 1628 are also attached to a movable platform 1636 via universal or spherical joints 1638. Each of the joints 1634, 1638 has 2-DOF motion.

The terms "prismatic-universal-universal" and "prismatic-universal-spherical" refers to the linear sliders 1629, the universal joints 1634, and the joints 1638, which may be universal or spherical joints. The three outer serial chains 1624 provide three individually driven serial chains for 3-DOF motion control. Each of the outer serial chains 1624 includes a sub-mechanism including two parallel universal-universal chains provided by the joints 1634, 1638 and the bars 1628. The three outer serial chains 1624 maintains orientation of the end effector (or platform) 1636.

The center serial chain 1626 includes a first universal joint 1650 mounted to a cap 1652. The cap 1652 is mounted to the top plate 1620. The center serial chain 1626 further includes: a linear telescopic sliding shaft (or first shaft) 1656 including an inner member 1658 and an outer member 1660; a second universal joint 1662; a second shaft 1664; the platform 1636; and the fastening tool (e.g., a nut runner) 1612. The term "universal-prismatic-universal" refers to the first universal joint 1650, the first shaft 1656, and the second universal joint 1662. The first shaft 1656 may be referred to as a prismatic joint. The second universal joint 1662 is in alignment with the first universal joint 1650, such that the axis along the pair of forks of the first universal joint 1650 mounted on the first shaft 1656 (on inner member 1658) is parallel to the axis along the pair of forks of the second universal joint 1662 mounted on the first shaft 1656 (on outer member 160). The center serial chain 1626 is able to extend or retract due to the first shaft 1656, where the outer member 1660 is free to slide relative to the inner member 1658, which allows vertical movement of the platform 1636. The center chain (or the UPU chain) provides 5DOF, where the rotational motion around the chain axis (vertical axis at the initial position) is limited. This allows the chain to counter the twist torque of the nutrunner when in passive mode, or transfer torque to the tip end when in active mode. When in active mode, a motor may be implemented behind the first U joint. The flange of the motor is fixed on the top plate. The motor shaft is connected to the first U joint via a coupling. The center serial chain 1626 allows for 6-DOF motion in an active state and applying torque; it allows 5DOF motion in a passive state and countering driving torque of the fastening tool 1612. More specifically, 6DOF are provided when driving actively, where the first universal joint is able to rotate and 5DOF are provided when using the center serial chain for torque resistance. In the 5DOF case, the first universal joint is locked from rotations, thus one less DOF. The universal joints 1650, 1662 resist and/or counteract torque associated with running the fastening tool 1612.

The platform 1636 is held in place by the three outer serial chains (or legs, with each chain/leg consisting of two parallel links) 1624 and the center serial chain (or leg) 1626 and is able to be moved with little resistance by an operator. A control module (e.g., the control module 170 of FIG. 4) connected to the rotary motors 1630, a motor of the fastening tool 1612, and a sensor 1672 and controls positioning of the platform 1636 and thus the fastening tool 1612 relative to the stand 1602, the top plate 1620, the supporting platform 1604, and the device 1606. The control module may detect force applied on the platform 1636 via the sensor 1672 and in response assist the operator 1608 in movement of the platform 1636 in the direction of the applied force based on feedback from the sensor 1672. Thus, active compliance is provided as described above. The sensor 1672 may be configured and operate similarly as the sensor 172 of FIGS. 1-8. The platform 1636 may be moved in x, y, z directions. The platform 1636 is maintained in a parallel state relative to the supporting platform 1604, the top plate 1620, and/or a ground (or floor) on which the stand 1602 is set. The platform 1636 is not rotatable via the robotic system 1600. The platform 1636 may include handles as described above for movement of the platform 1636.

The above-described robotic systems include 6-DOF and 3-DOF systems. The 6-DOF systems provide freedom of operations in different x, y, z directions and angles relative to the x, y, z axes. The 3-DOF systems provide freedom of operations in different x, y, z directions. Parallel robot serial chains provide high load capacity and system rigidity. Outer serial chains may be arranged at various angles for improved operator access. The 3-DOF systems are simplified versions of the 6-DOF systems. The 3-DOF system can save build costs but loses the flexibility of fastening, for example, nuts at tilted/angled orientations.

Figure 25:
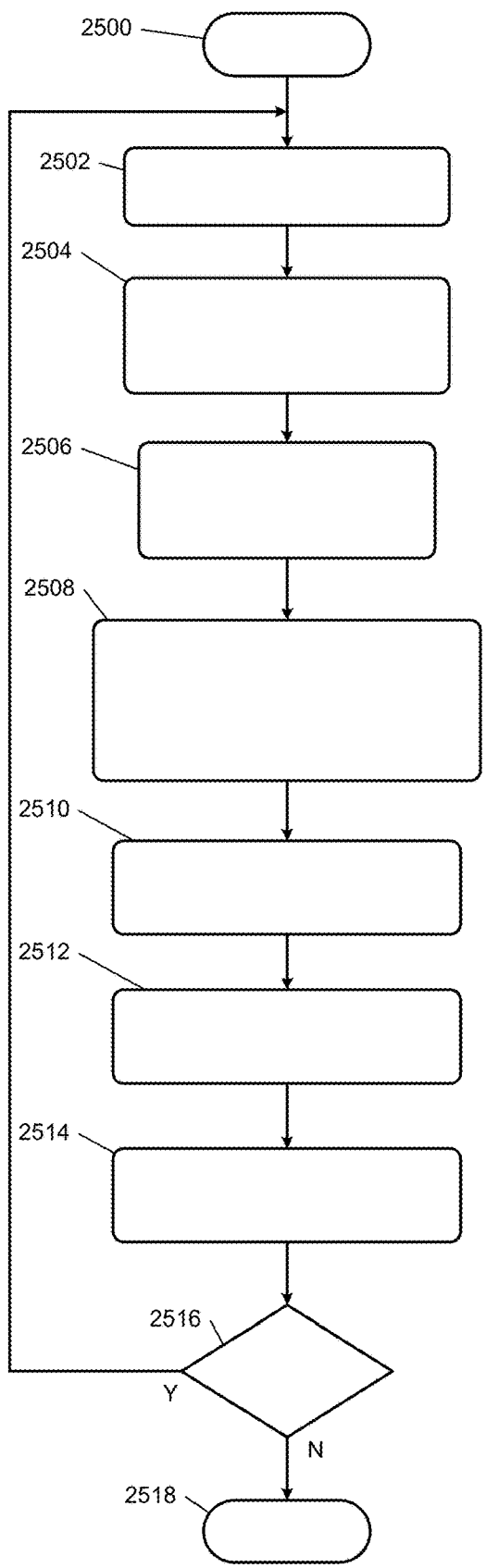
FIG. 25 illustrates a method of operating a robotic system in accordance with the present disclosure.

FIG. 25 shows a method of operating a robotic system, such as any of the robotic systems disclosed herein. The method may begin at 2500. At 2502, a fastening tool may grab a fastener, as described above. At 2504, a sensor (e.g., the sensor 172 of FIG. 4 or other sensor disclosed herein) of a platform (e.g., platform 130 of FIG. 4 or other movable platform) of the robotic system may detect force(s) and/or torque(s) applied to the platform.

At 2506, a control module (e.g., the control module 170 of FIG. 4) may generate one or more control signals respectively for one or more motors based on the output of the sensor. In one embodiment, the operations performed by the control module are implemented as machine-executable instructions stored on a non-transitory computer-readable medium. At 2508, the control module provides active compliance by controlling output of the one or more motors to assist in movement of the platform based on the one or more motor control signals. The assisted movement may be in x, y, z directions and/or about x, y, z axes.

At 2510, the control module may receive or generate an indication to begin fastening a fastener. This may be based on an input received from a user via the input device (e.g., the input device 173 of FIG. 4) and/or based on a location and/or orientation of the platform. At 2512, the control module via the fastening tool torques down the fastener to a predetermined torque level. At 2514, the control module generates an indication that the fastener is torqued down and releases the fastener. If there is another fastener to torque down, operation 2502 may be performed, otherwise the method may end at 2018.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium (CRM). The term CRM, as used herein, does not encompass transitory electrical or electromagnetic signals propagating through a medium (such as on a carrier wave); the term computer-readable medium may therefore be considered tangible and non-transitory. Non-limiting examples of a non-transitory, tangible CRM are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible CRM. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A robotic system comprising:
a support structure;
a movable platform;
a center serial chain connecting directly or indirectly a center of the movable platform to the support structure and comprising a first plurality of joints connected directly or indirectly to a linear sliding shaft;
a plurality of outer serial chains disposed radially outward of the center serial chain, wherein each of the plurality of outer serial chains comprises a second plurality of joints connecting a bar directly or indirectly to the movable platform and the supporting structure;
a plurality of motors connected to the plurality of outer serial chains;
a sensor connected to the movable platform and configured to detect at least one of force or torque applied by a human operator on the movable platforms and generate a signal indicative of the at least one of force or torque applied; and
a control module configured to control the plurality of motors based on the signal to assist the human operator in at least one of moving or rotating the movable platform.

2. The robotic system of claim 1, wherein:
the plurality of outer serial chains comprise three pairs of outer serial chains; and
each pair of outer serial chains comprises two outer serial chains.

3. The robotic system of claim 1, wherein the plurality of outer serial chains comprises six outer serial chains.

4. The robotic system of claim 1, wherein:
the second plurality of joints of each of the plurality of outer serial chains comprises a first joint and a second joint;
the first joint of each of the plurality of outer serial chains is a universal joint; and
the second joint of each of the plurality of outer serial chains is a spherical joint.

5. The robotic system of claim 4, wherein:
the plurality of outer serial chains comprise three pairs of chains; and
the control module is configured to independently actuate each of the plurality of outer serial chains.

6. The robotic system of claim 5, further comprising a plurality of linear sliders, wherein:
the plurality of outer serial chains comprise three pairs of chains; and
each of the three pairs of chains is connected to a respective one of the plurality of linear sliders.

7. The robotic system of claim 1, wherein:
the first plurality of joints of the center serial chain comprise a first in and a second joint; and
the first joint and the second joint are universal joints.

8. The robotic system of claim 7, wherein:
a drive fork of the first joint is in alignment with a drive fork of the second joint; and
a driven fork of the first joint is in alignment with a driven fork of the second joint.

9. The robotic system of claim 1, wherein the plurality of outer serial chains and the center serial chain provide three degrees-of-freedom motion for the movable platform or six degrees-of-freedom motion for the movable platform.

10. The robotic system of claim 1, wherein the plurality of outer serial chains comprise:
a first outer serial chain;
a second outer serial chain disposed 120° of separation azimuthally from the first outer serial chain relative to a center line extending through the center serial chain; and
a third outer serial chain disposed 120° of separation azimuthally from the first outer serial chain and the second outer serial chain relative to the center line extending through the center serial chain.

11. The robotic system of claim 1, wherein the plurality of outer serial chains comprise:
a first outer serial chain;
a second outer serial chain disposed 90° of separation azimuthally from the first outer serial chain relative to a center line extending through the center serial chain; and
a third outer serial chain disposed 180° of separation azimuthally from the first outer serial chain and the second outer serial chain relative to the center line extending through the center serial chain.

12. The robotic system of claim 1, further comprising:
a fastening tool; and a bearing disposed between the movable platform and the fastening tool.

13. A robotic system comprising:
a support structure;
a movable platform;
a universal-prismatic-universal serial chain directly or indirectly connecting a center of the movable platform to the support structure;
a plurality of outer serial chains disposed radially outward of the universal-prismatic-universal serial chain, wherein each of the plurality of outer serial chains is a prismatic-universal-spherical serial chain, and wherein each of the plurality of outer serial chains connects the movable platform to the support structure;
a plurality of motors connected to the plurality of outer serial chains;
a sensor connected to the movable platform and configured to detect at least one of force or torque applied by a human operator on the movable platform and generate a signal indicative of the at least one of force or torque applied; and
a control module configured to control the plurality of motors based on the signal to assist the human operator in at least one of moving or rotating the movable platform.

14. The robotic system of claim 13, wherein the universal-prismatic-universal serial chain comprises a first universal joint, a linear sliding shaft, and a second universal joint.

15. The robotic system of claim 13, wherein each of the plurality of outer serial chains comprise a linear slider, a universal joint, a bar and a spherical joint.

16. A robotic system comprising:
a support structure;
a movable platform;
a universal-prismatic-universal serial chain directly or indirectly connecting a center of the movable platform to the support structure;
a plurality of revolute-universal-spherical serial chains disposed radially outward of the universal-prismatic-universal serial chain, wherein each of the plurality of revolute-universal-spherical serial chains connects the movable platform to the support structure;
a plurality of motors connected to the plurality of revolute-universal-spherical serial chains;
a sensor connected to the movable platform and configured to detect at least one of force or torque applied by a human operator on the movable platform and generate a signal indicative of the at least one of force or torque applied; and
a control module configured to control the plurality of motors based on the signal to assist the human operator in at least one of moving or rotating the movable platform.

17. The robotic system of claim 16, wherein the universal-prismatic-universal serial chain comprises a first universal joint, a linear sliding shaft, and a second universal joint.

18. The robotic system of claim 16, wherein each of the plurality of revolute-universal-spherical serial chains comprise a revolute joint, a first bar, a universal joint, a second bar and a spherical joint.

19. The robotic system of claim 1, wherein:
an end of the center serial chain that is connected to the support structure is not connected to a motor; and
the control module is configured to control the plurality of motors for six degrees-of-freedom motion of the movable platform.

20. The robotic system of claim 1, wherein:
the plurality of motors include six motors for independent actuation of six outer serial chains; and
the plurality of outer serial chains comprise the six outer serial chains.

* * * * *